US011620673B1

(12) United States Patent
Paquette et al.

(10) Patent No.: US 11,620,673 B1
(45) Date of Patent: Apr. 4, 2023

(54) INTERACTIVE ESTIMATES OF MEDIA DELIVERY AND USER INTERACTIONS BASED ON SECURE MERGES OF DE-IDENTIFIED RECORDS

(71) Applicant: DEEPINTENT, INC., New York, NY (US)

(72) Inventors: Chris Paquette, Miami, FL (US); Anton Yazovskiy, Brooklyn, NY (US); Jennifer Werther Perlman, Hillsdale, NJ (US); Kate Bennett Andreyev, New York, NY (US)

(73) Assignee: DeepIntent, Inc., New York, NY (US)

( * ) Notice: Subject to any disclaimer, the term of this patent is extended or adjusted under 35 U.S.C. 154(b) by 0 days.

(21) Appl. No.: 17/967,822

(22) Filed: Oct. 17, 2022

Related U.S. Application Data

(63) and a continuation-in-part of application No. 16/748,532, filed on Jan. 21, 2020, now Pat. No. 11,475,155.
(Continued)

(51) Int. Cl.
*G06Q 30/0242* (2023.01)
*G06F 21/53* (2013.01)
*G06F 21/62* (2013.01)

(52) U.S. Cl.
CPC ......... *G06Q 30/0242* (2013.01); *G06F 21/53* (2013.01); *G06F 21/6245* (2013.01)

(58) Field of Classification Search
CPC .. G06Q 30/0242; G06F 21/53; G06F 21/6245
See application file for complete search history.

(56) References Cited

U.S. PATENT DOCUMENTS 10,558,924 B2  2/2020 Achin
10,713,589 B1*  7/2020 Zarandioon ............... G06N 5/01
(Continued)

FOREIGN PATENT DOCUMENTS

WO  WO-2019200402 A1 * 10/2019 ......... G06F 21/6245

OTHER PUBLICATIONS

M.I. Jordan et al., *Machine learning: Trends, Perspectives, and Prospects*, Science vol. 349 Issue 6245 (2015), 7 pages, http://www.cs.cmu.edu/~tom/pubs/Science-ML-2015.pdf, Jul. 17, 2015.
(Continued)

*Primary Examiner* — Abiy Getachew
(74) *Attorney, Agent, or Firm* — Baker Botts L.L.P.

(57) ABSTRACT

In one embodiment, a computer implemented method comprises receiving and storing in relational database tables in a secure data processing environment comprising one or more first virtual machine instances coupled to one or more first data stores, master data comprising records having first de-identified token values associated with health data and second data comprising records having second de-identified token values associated with historical media delivery data; in the secure data processing environment, executing one or more database table join operations to merge the master data and the second data to produce a joined table having records comprising third de-identified token values associated with the health data and the second data; receiving, using one or more virtual computing instances of a service provider environment, one or more filter specifications that define a target audience and a forecast request, and in real time in response to the forecast request: based on the one or more filter specifications, executing one or more queries to the joined table in the secure data processing environment; receiving, in the service provider environment, de-identified aggregated data that the secure data processing environment
(Continued)

has generated based upon the one or more queries to the joined table; based on the de-identified aggregated data and second data, generating an estimate of media delivery reach; presenting the estimate of the media delivery reach to a user computer that is communicatively coupled to the service provider environment.

30 Claims, 17 Drawing Sheets

Related U.S. Application Data

(60) Provisional application No. 63/404,526, filed on Sep. 7, 2022.

(56) References Cited

U.S. PATENT DOCUMENTS

| | | | |
|---|---|---|---|
| 10,726,356 B1 | 7/2020 | Zarandioon | |
| 2003/0172043 A1* | 9/2003 | Guyon | G16B 40/30 706/48 |
| 2010/0177950 A1 | 7/2010 | Donovan | |
| 2011/0054864 A1 | 3/2011 | Lundstedt | |
| 2011/0270779 A1 | 11/2011 | Showalter | |
| 2012/0150773 A1 | 6/2012 | Dicorpo | |
| 2012/0303558 A1 | 11/2012 | Jaiswal | |
| 2015/0317589 A1 | 11/2015 | Anderson | |
| 2017/0177907 A1 | 6/2017 | Scaiano | |
| 2017/0372029 A1 | 12/2017 | Saliman | |
| 2019/0102802 A1* | 4/2019 | Tuschman | G06N 20/00 |
| 2019/0220705 A1 | 7/2019 | Min | |
| 2019/0260730 A1 | 8/2019 | Mainali | |
| 2019/0384469 A1 | 12/2019 | Lo | |
| 2020/0349169 A1 | 11/2020 | Venkatesan | |
| 2020/0409822 A1* | 12/2020 | Balasubramanian | G06F 11/302 |
| 2021/0090694 A1 | 3/2021 | Colley | |
| 2021/0097343 A1* | 4/2021 | Goodsitt | G06F 18/2178 |

OTHER PUBLICATIONS

Mark J. van der Laan et al., *Entering the Era of Data Science: Targeted Learning and the Integration of Statistics and Computational Data Analysis*, Advances in Stat. Analysis (2014), 7 pages, https://www.hindawi.com/journals/as/2014/502678/, published Sep. 10, 2014.

Puja P. Pathak, *Logistic Regression and Maximum Likelihood Estimation Function*, Medium (Apr. 9, 2021), 9 pages, https://medium.com/codex/logistic-regression-and-maximum-likelihood-estimation-function-5d8d998245f9, Apr. 9, 2021.

Giuseppe Carleo et al., *Machine Learning and the Physical Sciences*, 91 Rev. of Modern Physics (2019), 47 pages, at https://journals.aps.org/rmp/abstract/10.1103/RevModPhys.91.045002, Dec. 6, 2019.

Stacey Truex; A Hybrid Approach to Privacy-Preserving Federated Learning; ACM; 2019; pp. 1-11.

Payman Mohassel; SecureML: A system for Scalable Privacy-Preserving Machine Learning: IEEE: 2017; pp. 19-38.

Qiang Yang, Federated Machine Learning: Concept and Applications; ACM Trans. Intell. Syst. Technol. 10, 2, Article 12, Jan. 2019, 19 pages.

Vrountas, 5 Examples That Show How Machine Learning is Changing Digital Advertising, updated in Advertising, Nov. 19, 2019, 17 pages.

Kaput, Artificial Intelligence in Advertising, Jan. 18, 2021, 13 pages.

* cited by examiner

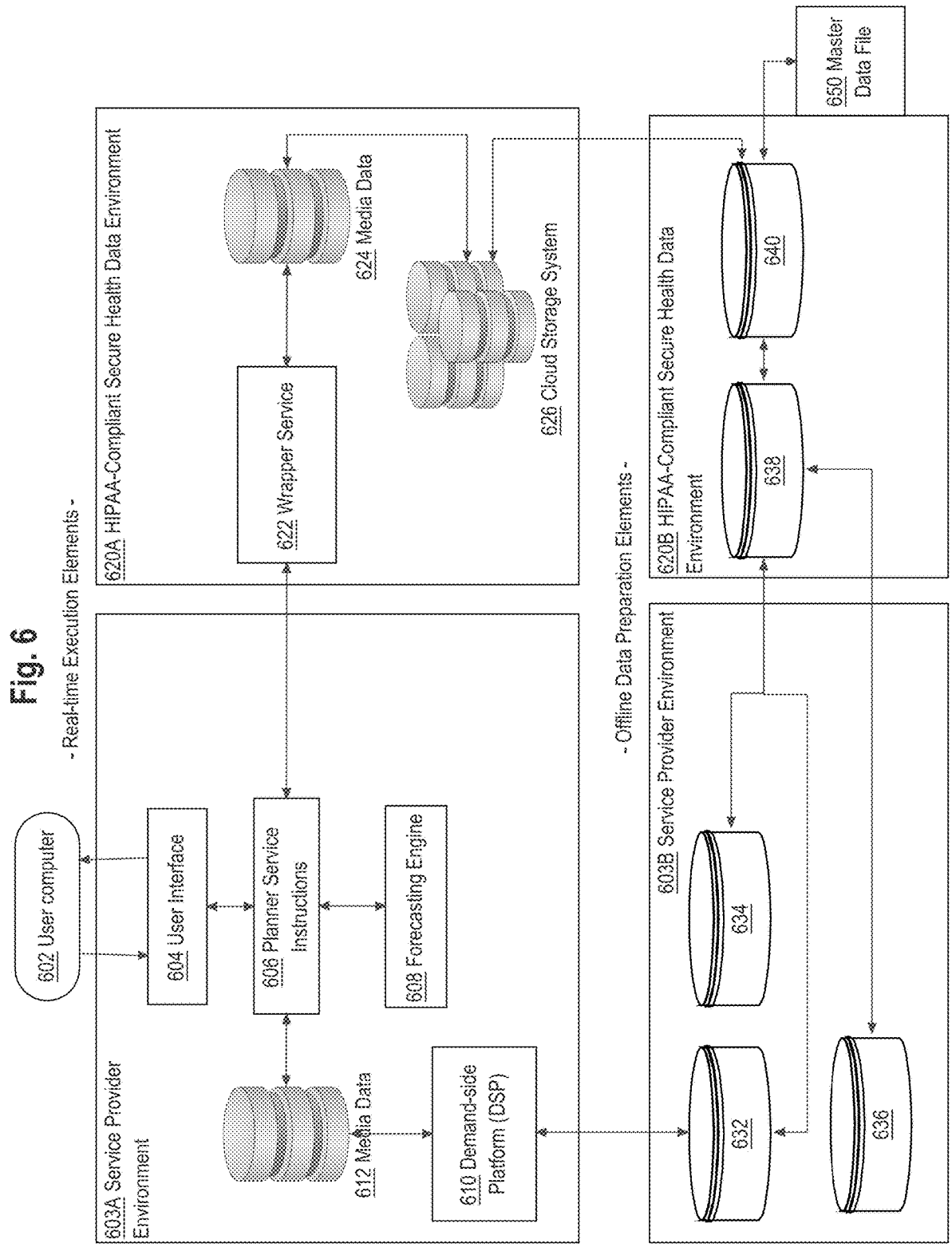

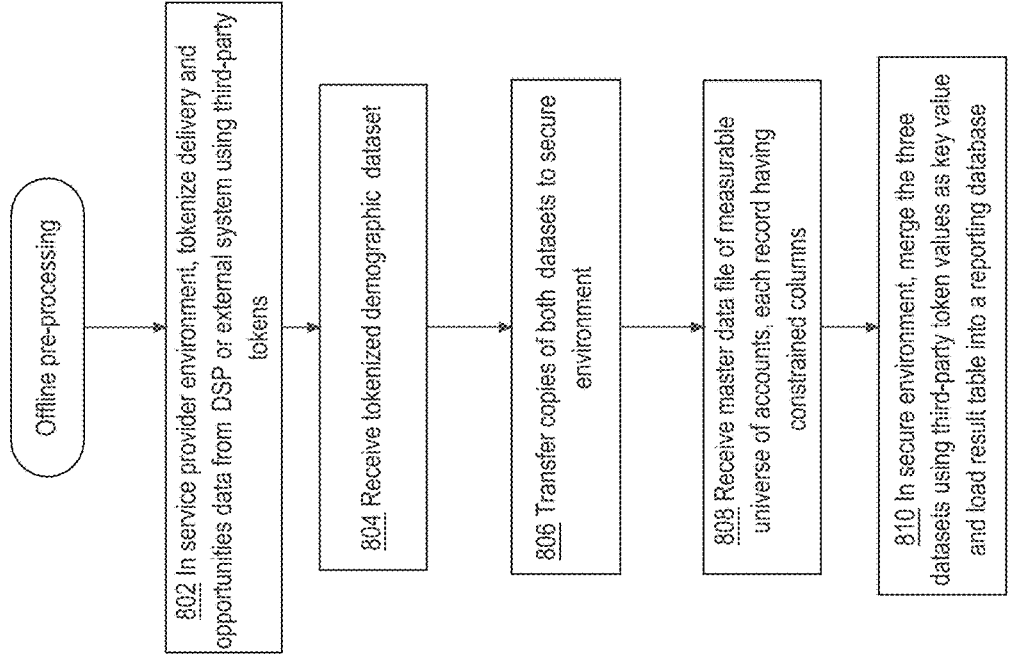
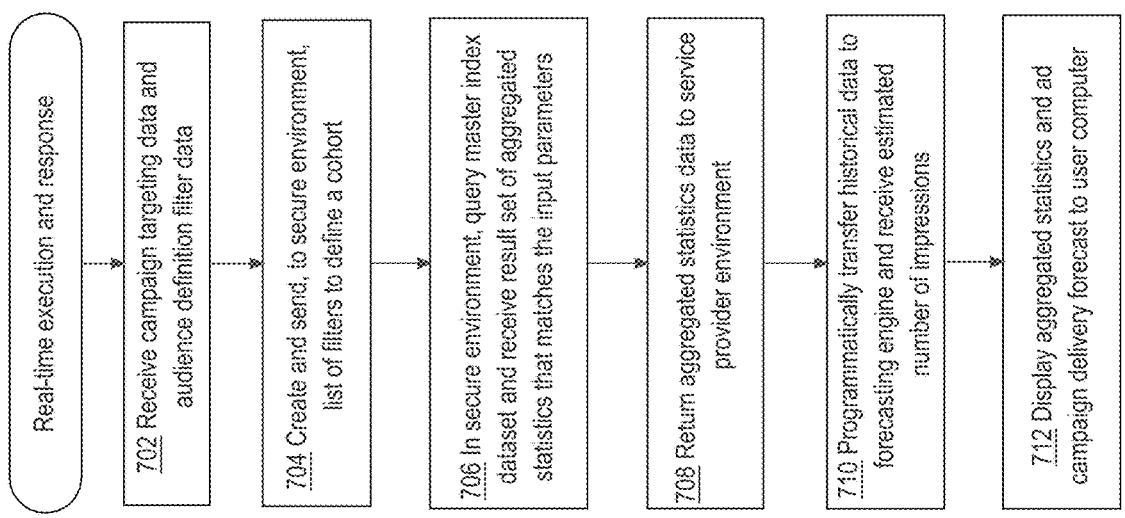

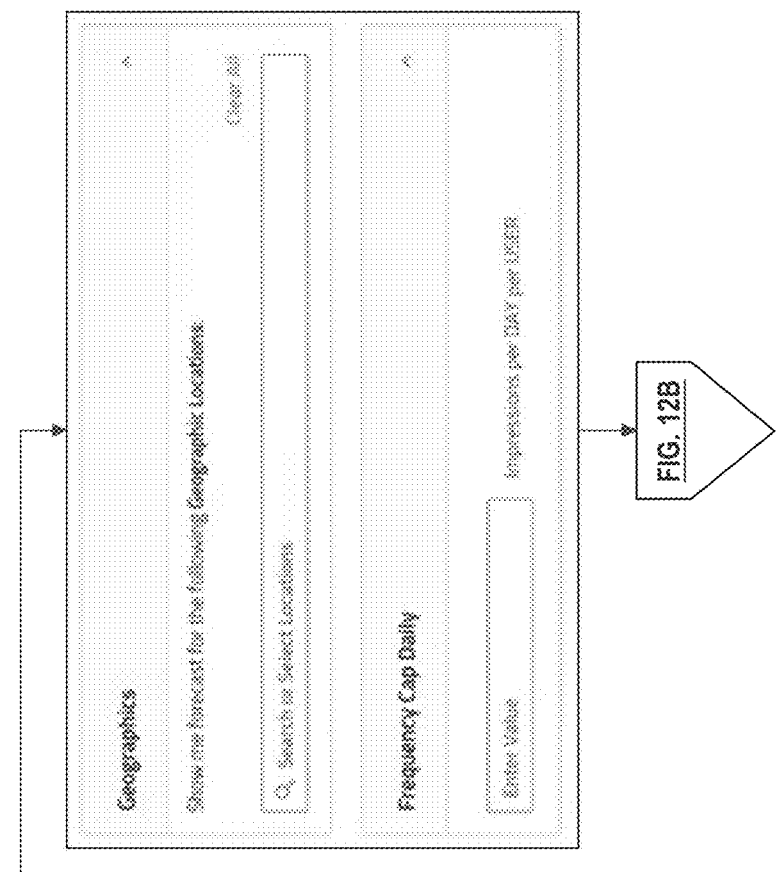
Fig. 12A

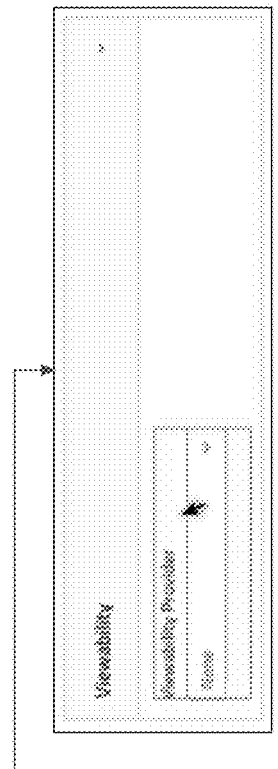
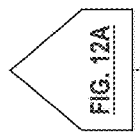
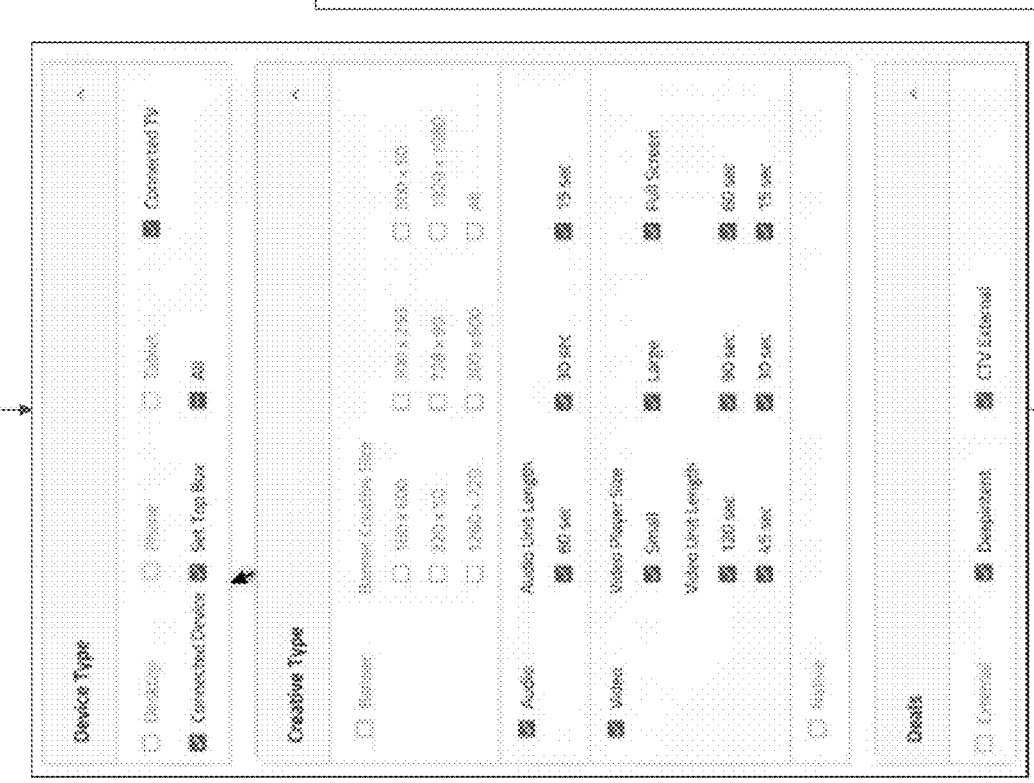

INTERACTIVE ESTIMATES OF MEDIA DELIVERY AND USER INTERACTIONS BASED ON SECURE MERGES OF DE-IDENTIFIED RECORDS

BENEFIT CLAIM

This application claims the benefit under 35 U.S.C. § 120 as a continuation-in-part of application Ser. No. 16/748,532, filed Jan. 21, 2020, and claims the benefit under 35 U.S.C. § 119 of provisional application 63/404,526, filed Sep. 7, 2022, the entire contents of which are hereby incorporated by reference for all purposes as if fully set forth herein. Applicant hereby rescinds any disclaimer of claim scope in the application(s) of which the benefit is claimed and advises the USPTO that the present claims may be broader than any application(s) of which the benefit is claimed.

FIELD OF THE DISCLOSURE

One technical field of the disclosure is computer implemented demand-side platform (DSP) systems, which are used in digital advertising technology. Another technical field is relational databases and specifically the use under stored program control of automatic joins of tables that store different datasets.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Machine learning systems have become popular for solving various types of problems based on training data. A key benefit of a machine learning system is the ability to learn based on data, bypassing any requirements for manual coding of an algorithm. Instead, the machine learning system generates an algorithm or model through repeated computations using the training data.

A potential drawback of machine learning systems is that determining specific internal operating mechanisms of the core machine learning engine can be difficult. Most machine learning systems are configured to generate fairly complex patterns based on the given training data. Because machine learning systems use complex algorithms and execute continuous learning, determining why a machine learning system produced a particular result from a set of input data can be difficult, if not impossible. In some situations, this can lead to a lack of accountability; in other situations, this feature protects the training data. Because a trained machine learning system exists separately from the training data, any data that is protected or sensitive data can be safeguarded during the use of the machine learning system.

A trained machine learning system inherently protects the data used to train it. However, the training phase can create issues, especially when the data used to train the machine learning system is robust but protected. Many people provide data under the assurance that data security measures will be used. As an example, the Health Insurance Portability and Accountability Act (HIPAA) has stringent requirements on the protection of medical claims data which would prevent a person from viewing any of the medical claims data to train a machine learning system.

Additionally, even when information is protected from viewing, the training data or machine learning system can still provide protected information to a viewer. For instance, a machine learning system using ten inputs could memorize a vast majority of people in the United States, thereby providing one-to-one recognition of individuals instead of providing an algorithm that produces a likelihood based on general patterns. But to validate the training data or the machine learning system would generally involve accessing the training data or machine learning system, thereby failing to provide the originally desired protections.

Thus, there is a need for a system that can protect personal, private, confidential, or otherwise protected information during training and validation of a machine learning system that utilizes the protected information. Digital advertising technology (ad tech) uses distributed computer systems under stored program control to determine what media or contents that user computers are accessing, as well as what digital advertising units to select and transmit or place in media, content or other locations. Ad tech systems have developed sophisticated means for bidding on the placement of electronic ad units within websites, mobile device feeds and other applications. However, present ad tech systems still suffer from many limitations.

Many advertising agencies, pharmaceutical companies, medical equipment companies, insurance companies and other healthcare related firms wish to enhance media delivery, advertising and content engagement, impressions, clicks, and reach of healthcare products and services and related content to clinically relevant individuals. Advertising campaign and content deployment can entail any of advertising, data, and media platforms and systems for targeted distribution of product information. Determining the appropriate online identities of relevant individuals and where to deliver information regarding specific products and services can be challenging given the myriad types of medical conditions, the multitude of different products in the healthcare industry, as well as the diversity of demographic attributes and other individual and clinical behavior that must be considered. Combinations of health data, prescription data, demographic data, user location, certification, appointment scheduling, payment data, online behavior, automated content recognition (ACR) data, media consumption and interaction data, business-individual relationship data, and other information relating to individuals are not generally accessible to agencies for use in determining which individuals would be best fit for distributing information pertaining to particular products or may be outdated, not fully comprehensive and not coordinated with other data, and therefore limited in its utility. Still another challenge is maintaining the privacy of individuals who are subjects of the data. Thus, advertising, data, and media platforms and systems often distribute product information to individuals who would not benefit from such distribution and/or omit distribution to many individuals who would benefit.

Data sellers are known to sell data defining audience segments into advertising and media platforms and systems, like demand-side platforms (DSPs). These approaches usually allow for only minimal customization of the audience to be targeted and rely on buckets or segments of cookie or device data that have been manually tagged to indicate a particular audience characteristic. Other data providers offer data via platforms which provide counts and aggregations for how many users with various attributes are recorded in a database of individuals; these platforms do not have the technology required to combine, query, and transfer audience data for optimal use. The lack of integration in this approach precludes accurate and comprehensive forecasting of engagement with advertisements in real time. Furthermore, existing systems may use individual data stores based on browser cookie limitations and provide no sound way to unify digital identity data with third-party data.

Therefore, there is an acute need in the field to address the technical problem of how to automatically join and/or correlate disparate datasets of healthcare data in conjunction with digital presence data relating to clinically relevant individuals to find better ways of transmitting relevant content to these parties in real time, including providing distribution costs and performance data. There is also a need for better tools for planning campaigns in terms of creating clinically relevant audiences, forecasting estimates of media delivery, reach, and cost, and statistical results of supplying audience data to advertising, data, and media platforms and systems. There is also a further need for better tools for creating the framework to research, assess, and analyze potential audiences and data sources or potential individual and patient reach.

SUMMARY

The appended claims may serve as a summary of the disclosure.

BRIEF DESCRIPTION OF THE DRAWINGS

In the drawings:

FIG. 6 is a data flow diagram that illustrates example function elements of a distributed computing system that can implement an embodiment of a patient planner service.

FIG. 7 illustrates an example process or algorithm that can be programmed to implement an embodiment.

FIG. 8 illustrates an example process or algorithm that can be programmed to implement an embodiment.

FIG. 12A, FIG. 12B illustrate examples of graphical user interfaces that can be programmed to receive input specifying forecast data filter criteria.

DETAILED DESCRIPTION

Figure 1:
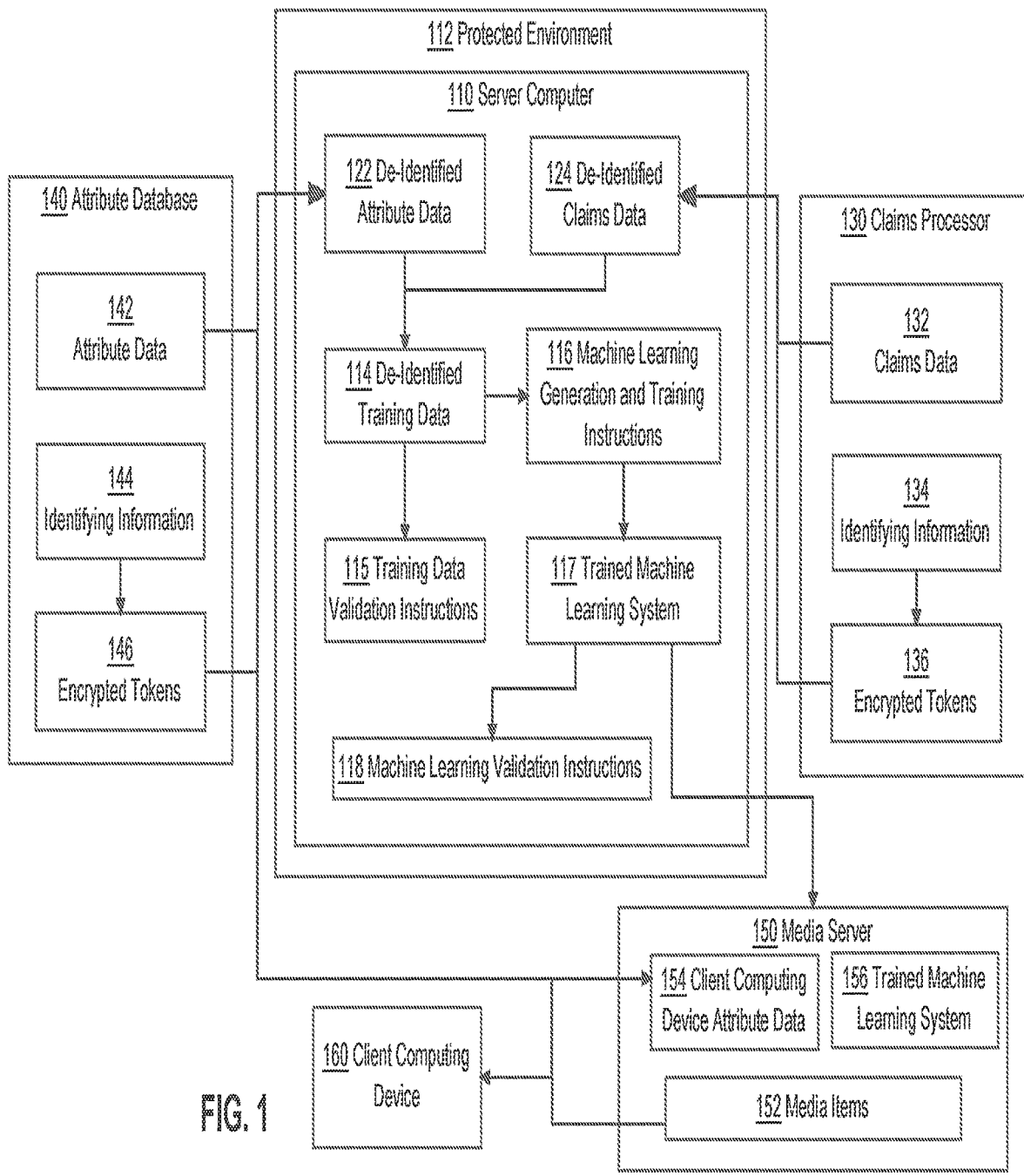
FIG. 1 depicts an example system for secure training and distribution of a machine learning system using protected data.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are described in the sections below according to the following outline:

1. PATIENT MODELED AUDIENCES—SYSTEM OVERVIEW
   1.1 GENERAL OVERVIEW
   1.2 STRUCTURAL OVERVIEW
   1.3 PROCESS OVERVIEW
   1.4 PROTECTED ENVIRONMENT IMPLEMENTATION
   1.5 MEDIA SERVER IMPLEMENTATION
   1.6 OUTCOME IMPLEMENTATION
2. PATIENT PLANNER PROCESS—SYSTEM OVERVIEW
   2.1 STRUCTURAL OVERVIEW
   2.2 PROCESS OVERVIEW
   2.3 INTEGRATION WITH AUDIENCE MODELING
3. BENEFITS OF CERTAIN EMBODIMENTS
4. HARDWARE OVERVIEW

1. Patient Modeled Audiences—System Overview 1.1 General Overview

Systems and methods for providing protection to information used in training machine learning models are described herein. In an embodiment, a server computer stores training data in a protected environment, the training data comprising a plurality of attributes and one or more status values for a plurality of personal data records. An external computing device sends a request to train a machine learning system using a subset of the plurality of attributes as inputs and a particular status value as the output. The server computer generates a training dataset and determines, within the protected environment, whether the training dataset satisfies a first criterion. If the training dataset satisfies the first criterion, the server computer generates a machine learning system, trains the machine learning system using the training dataset, and determines whether the trained machine learning system satisfies a second criterion. If the trained machine learning system satisfies the second criterion, the server computer sends the trained machine learning system out of the protected environment.

In an embodiment, a method is executed after the following steps have occurred: first data identifying one or more status values of a plurality of personal data records having been sent to a server computer from a processor server and stored in a de-identified manner through a generation of a unique identifier for each personal data record using a unique identifier generation scheme and encrypted using an encryption scheme; second data comprising a plurality of attributes for each of the plurality of personal data records having been sent to the server computer from a marketing database and stored in a de-identified manner through a generation of the unique identifier for each personal data record using the unique identifier generation scheme and encrypted using the encryption scheme; said first data and said second data having been sent to a server computer executing within a protected environment; the method comprising: electronically transmitting, to the server computer executing within the protected environment, instructions to generate a machine learning system and to train the machine learning system using the first data and the second data; the server computer being configured to train the machine learning system in the protected environment only if the first data and the second data satisfy a first criterion and is configured to transmit the trained machine learning system only if the trained machine learning system satisfies a second criterion; receiving the trained machined learning system from the protected environment; using the trained machine learning system, determining, for each of a plurality of sets of attributes, a likelihood that a personal data record corresponding to the set of attributes has a particular status value; if the likelihood that the personal data record corresponding to the set of attributes has the particular status value is greater than a threshold value, sending one or media items to a client computing device.

In an embodiment, a method comprises, storing, at a server computer executing within a protected environment, first data comprising a plurality of attributes for a plurality of personal data records and second data indicating, for each personal data record of the plurality of personal data records, secure data relating to a status value of the personal data record; receiving, from outside the protected environment, a request to generate and train a machine learning system using a subset of the first data comprising one or more of the plurality of attributes as inputs and a subset of the second data indicating whether a personal data record has a status value as outputs; determining, in the protected environment, whether the first data and second data satisfy a first criterion with relation to the status value; only if the first data and second data satisfy the first criterion with respect to the status value, training a machine learning system using the subset of the first data as inputs and the subset of the second data as outputs; determining, in the protected environment, whether the trained machine learning system satisfies a second criterion; only if the trained machine learning system satisfies the second criterion, transmitting the trained machine learning system outside the protected environment in response to the request.

In an embodiment, a method comprises sending, to a server computer executing within a protected environment, instructions to generate and train a machine learning system using attributes as inputs and existences of a status value as outputs, the server computer storing first data comprising a plurality of attributes for a plurality of personal data records and second data indicating, for each personal data record of the plurality of personal data records, whether the personal data record has the status value; wherein the server computer is configured to only train the machine learning system in the protected environment if the first data and the second data satisfy a first criterion and is only configured to transmit the trained machine learning system if the trained machine learning system satisfies a second criterion; receiving the trained machined learning system from the protected environment; using trained machine learning system, determining, for each of a plurality of sets of attributes, a likelihood that a personal data record corresponding to the set of attributes has the status value; if the likelihood that the personal data record corresponding to the set of attributes has the status value is greater than a threshold value, sending one or more media items to a client computing device corresponding to the personal data record.

1.2. Structural Overview

FIG. 1 depicts an example system for secure training and distribution of a machine learning system using protected data. Server computer 110, claims processor 130, attribute database 140, media server 150, and client computing device 160 are communicative coupled over one or more networks. The network(s) broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, claims processor 130, attribute database 140, media server 150, client computing device 160, and other elements of the system each comprise an interface compatible with the network(s) and are programmed or configured to use standardized protocols for communication across the networks such as TCP/IP, Bluetooth, CAN protocol and higher-layer protocols such as HTTP, TLS, and the like.

Claims processor 130 comprises one or more computing systems configured to receive and store claims data. Claims processor 130 stores claims data 132 and identifying information 134. Claims data 132 comprises data identifying one or more status values for a plurality of personal data records. For example, claims data may comprise medical claims records identifying diagnosis codes, such as the International Statistical Classification of Diseases and Related Health Problems (ICD) codes, codes for procedures such as Current Procedural Terminology (CPT) codes, Healthcare Common Procedure Coding System (HCPCS) codes, or J codes, codes associated with healthcare providers (HCPs), NDC codes for prescriptions, or LOINC codes for laboratory tests.

The status values may comprise existence or non-existence of specific codes, such as an ICD-10 code for a diagnosis of Type II diabetes. The claims data 132 may be associated with identifying information 134, such as names, addresses, birthdates, or other identifying information of a personal data record. Claims processor 130 uses the identifying information 134 to generate encrypted tokens 136 using the methods described herein. Claims processor 130 sends claims data 132 with encrypted tokens 136 to server computer 110. Additionally or alternatively, claims processor 130 may send the claims data 132 and identifying information 134 to a tokenization server which then generates the encrypted tokens 136 from the identifying information using the methods described herein and sends the encrypted tokens and claims data to server computer 110.

Attribute database 140 comprises a data store, such as a relational database or other structured data storage, configured to store attribute information for a plurality of personal data records. Attribute database 140 stores attribute data 142 and identifying information 144. Attribute data 142 may comprise individual values for a plurality of values. For example, attribute database 140 may store a plurality of rows, each of the plurality of rows corresponding to a different personal data record, and a plurality of columns, each of the plurality of columns corresponding to a different attribute. Attributes may include personal information such as age, physical activity level, weight, hair color, and/or eye color, data relating to an online search history, such as existence of particular search terms, websites visited, or other internet history, or data relating to one or more online accounts, such as social network accounts or other memberships. The attribute data 142 may be associated with identifying information 144 such as names, addresses, birthdates, or other identifying information of a personal data record. Attribute database 140 uses identifying information 144 to generate encrypted tokens 146 using the methods described herein. Attribute database 140 sends attribute data 142 with encrypted tokens 146 to server computer 110.

Additionally or alternatively, attribute database 140 may send the attribute data 142 and identifying information 144 to a tokenization server which then generates the encrypted tokens 146 from the identifying information using the methods described herein and sends the encrypted tokens and attribute data to server computer 110.

Server computer 110 comprises one or more computing devices configured to generate and train one or more machine learning systems. Server computer 110 may be a physical server computer and/or a virtual server instance stored in a data center, such as through cloud computing. Server computer 110 may be configured to generate and train the machine learning system within protected environment 112. Protected environment 112 comprises a hardware or software environment which may include one or more server computers, such as server computer 110, one or more local networks, a load balancer, and/or data storage. Protected environment 112 is configured to protect data stored within the environment, such as through a firewall or other network security systems which restricts access through a network, such as the internet, to the various systems or devices within the protected environment. The protected environment 112 may be configured to not release data from the environment that does not meet certain criteria, as described further herein. In this manner, the protected environment may be used as a barrier to protect specific types of information, such as confidential information or restricted-use data, such as medical claims which are protected under HIPAA.

Server computer 110 stores de-identified attribute data 122 received from attribute database 140 and de-identified claims data 124 received from claims processor 130. The deidentified attribute data 122 and de-identified claims data 124 may comprise attributes and claims respectfully which are mapped to encrypted tokens but do not include any identifying information. Methods for generating the de-identified data are described further herein. Server computer 110 uses the de-identified attribute data 122 and de-identified claims data 124 to create de-identified training data 114 which server computer 110 stores. Server computer 110 further stores training data validation instructions 115, machine learning generation and training instructions 116, and machine learning validation instructions 118. De-identified training data 114 may be stored as a plurality of rows of data, each row corresponding to a different personal data record. The plurality of rows of data may include columns corresponding to different attributes of the personal data records and columns corresponding to status values, such as diagnosis codes, of the personal data records.

Training data validation instructions 115 comprise computer-readable instructions which, when executed by one or more processors of server computer 110, cause server computer 110 to determine whether a training dataset satisfies one or more criteria and perform a responsive action depending on whether the training dataset satisfies the one or more criteria. Machine learning generation and training instructions 116 comprise computer-readable instructions which, when executed by one or more processors of server computer 110, cause server computer 110 to generate a machine learning system based on one or more instructions and to train the machine learning system using de-identified training data 114. Machine learning validation instructions 118 comprise computer-readable instructions which, when executed by one or more processors of server computer 110, cause server computer 110 to determine whether a machine learning system satisfies one or more criteria and perform a responsive action depending on whether the training dataset satisfies the one or more criteria.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server 110.

The server computer 110 uses machine learning generation and training instructions 116 and de-identified training data 114 to generate trained machine learning system 117. For example, the server computer 110 may generate a training dataset from the de-identified training data 114 based on one or more instructions and use the training dataset to train a machine learning system generated by the server computer based on one or more instructions. Server computer 110 sends the trained machine learning system 117 to the media server 150.

Media server 150 comprises one or more computers configured to send media to one or more client computing devices in response to a request. Media server 150 stores media items 152 and trained machine learning system 156 received from server computer 110. Media items 152 comprise one or more images, videos, or other media items that may be served to a client computing device. Media server 150 is configured to communicate with client computing device 160 to determine whether to send a media item of media items 152 to client computing device 160. Media server 150 determines whether to send a media item using client computing device attribute data 154 stored in media server 150.

Client computing device attribute data 154 comprises one or more attributes corresponding to the client computing device 160, such as attributes relating to a personal data record corresponding to the client computing device. Client computing device attribute data 154 may be received from client computing device 160, attribute database 140, and/or one or more other attribute sources. For example, the media server 150 may receive identifying information from client computing device 160 which the media server 150 sends to the attribute database 140 with a request for attribute data relating to client computing device 160.

While FIG. 1 depicts a single instances of server computer 110, attribute database 140, claims processor 130, media server 150, and client computing device 160 for the purpose of demonstrating a clear example, in some embodiments, the systems and devices in FIG. 1 may comprise a plurality of different systems or devices. For example, server computer 110 may comprise a plurality of server computers and/or external storage devices which store attribute data, claims data, training data, and/or any other data stored within protected environment 112. As another example, server computer 110 may communicate with a plurality of media servers 150, each of which may communicate with a plurality of client computing devices 160.

1.3 Process Overview

Figure 2:
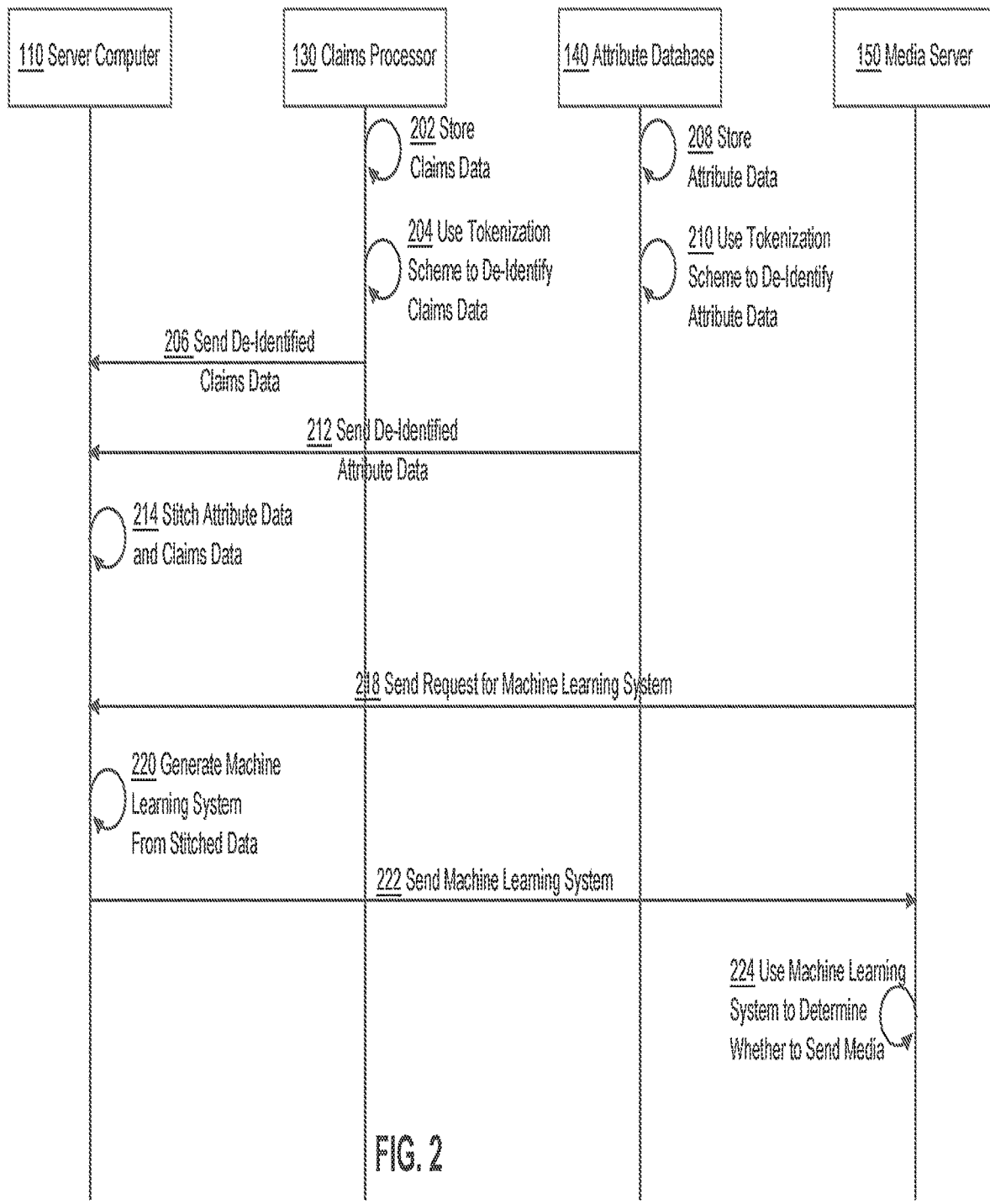
FIG. 2 depicts an example message diagram by which protected information is securely used to generate and train a machine learning system.

FIG. 2 depicts an example message diagram by which protected information is securely used to generate and use trained machine learning systems. FIG. 2 and other flow diagrams that are described herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

At step 202, claims processor 130 stores claims data. Claims data, as used herein, refers to status value data for one or more personal data records. Personal data records, as used herein, refer to a record of an individual with one or more values relating to said individual. Thus, an individual claims data record may identify a status of an individual as well as identify the individual through identification information, such as a name, birthdate, social security number, address, or other identifying information. The status of the individual may include a medical status, personal status, legal status, or any other data value relating to a status which may be stored in claims data records. For example, an individual claims data record may include a medical diagnosis from a medical professional. An example claims processor may comprise an intermediary between medical professionals and insurance agents, thus receiving medical records comprising protected data, such as diagnoses or prescriptions, which are then routed to insurance agents.

At step 204, claims processor 130 uses a tokenization scheme to de-identify the claims data. For example, the claims processor may create a data token by hashing specific pieces of identifying information, such as first name, last name, zip code, and date of birth, using a particular hash function and encrypting the hashed information. The claims processor may then create deidentified claims data comprising the data token and one or more status data values for the data token. As a practical example, if a claims data record comprised a full name, zip code, date of birth, and medical diagnosis for a personal data record, the claims processor 130 may generate the token using the identifying information and store a de-identified data record comprising the token and the medical diagnosis. As the token is generated from identifying information for a personal data record, the token is unique for each personal data record. While the disclosure describes a data token generated through hashing of identifying information and encryption of the hashed information, any identifying algorithmic scheme for generating a unique data token from identifying information may be used.

At step 206, claims processor 130 sends de-identified claims data to server computer 110. For example, claims processor 130 may send the plurality of tokens and corresponding status values for each of the plurality of tokens to server computer 110 which server computer 110 stores as de-identified claims data. Claims processor 130 may send the de-identified claims data as a plurality of data records, each of which comprising a unique token but not including any identifying information.

At step 208, attribute database 140 stores attribute data. Attribute data, as used herein, refers to a plurality of attribute data values for one or more personal data records. Thus, an individual attribute data record may identify a plurality of attributes of an individual as well as identify the individual through identification information, such as a name, birthdate, social security number, address, or other identifying information. Attributes may include known information relating to personal data records, such as personal information, internet history information, account information, or other stored information. In embodiments, attribute database 140 may store data relating to hundreds of attributes with data records containing information relating to a subset of the hundreds of attributes, such as when attribute data is unavailable for a particular personal data record for one or more of the attributes.

At step 210, attribute database 140 uses a tokenization scheme to de-identify the attributed data. In an embodiment, the tokenization scheme used by attribute database 140 to deidentify the attribute data is the same tokenization scheme used by claims processor 130 to deidentify the claims data. For example, if the tokenization scheme used by the claims processor involved using a particular hash function to hash a string comprising a first name, last name, and zip code and encrypting the hashed string using a particular encryption key, the tokenization scheme used by attribute database 140 may also use the particular hash function to hash the same string and encrypt the same hashed string using the same particular encryption key. In this manner, despite both claims processor 130 and attribute database 140 de-identifying information separately, the same token is created by both claims processor and attribute database 140 for the same personal data record. Additionally or alternatively, the tokenization may be provided by a tokenization server which uses the same method to generate tokens for claims processor 130 and attribute database 140. Attribute database 140 may then create the de-identified attribute data comprising, for each personal data record, a token and values for one or more of the attributes.

At step 212, attribute database 140 sends de-identified attribute data to server computer 110. For example, attribute database 140 may send the plurality of tokens and corresponding attribute values for each of the plurality of tokens to server computer 110 which server computer 110 stores as de-identified attribute data. Attribute database 140 may send the de-identified attribute data as a plurality of data records, each of which comprising a unique token but not including any identifying information.

At step 214, server computer 110 stitches attribute data and claims data into a stitched data set. For example, server computer 110 may generate a plurality of rows of data, each row corresponding to a particular personal data record. One example of a stitching technique may comprise a left join of the claims data to the attribute data, thereby keeping all attribute data but only storing, in the de-identified training data, claims data stored with a token that corresponds to a token of the attribute data. As another example, server computer 110 may identify claims data comprising a particular token and attribute data comprising the same particular token. Server computer 110 may generate a row of data for the particular token, the row of data comprising a plurality of columns for a plurality of attributes based on the attribute data and one or more columns for one or more status values based on the claims data. Thus, while each row comprises attribute data for a personal data record and claims data for the personal data record, the rows do not include identifying information for the personal data record.

While the systems and methods described in reference to FIG. 1 include the tokenization of identifying information, in other embodiments, the identifying information may not be tokenized and/or encrypted. For example, claims data 132, identifying information 134, attribute data 142, and identifying information 144 may be sent directly to the server computer where the server computer, in the protected environment stitches together the two datasets using the identifying information instead of using the encrypted tokens to match claims data to attribute data.

At step 218, media server 150 sends a request to server computer 110 for a machine learning system. The request may be sent through an application programing interface of the server computer 110 and may comprise identifications of input columns and output columns from the stitched data. For example, the request may identify a subset of the plurality of attributes to be used as inputs and existence of a particular status value as an output. The request may additionally include parameters for the machine learning system, such as number of nodes or layers.

At step 220, server computer 110 generates a machine learning system from the stitched data based on the request. For example, the server computer 110 may generate a machine learning system, such as a random forest model, neural network, logistic regression, or gradient boosted decision tree such as the XGBoost algorithm, using stored parameters and/or parameters received from media server 150. The server computer 110 may then train the machine learning system using the attributes identified by media server 150 as inputs and a status value for a particular status as an output.

As a practical example, media server computer may identify five input attributes of age, gender, average number of checkups, weight, and height and an output status value indicating existence or non-existence of a diabetes diagnosis. Server computer may identify corresponding columns of the attribute data and claims data and generate a training dataset using only those columns. Additionally or alternatively, the server computer may generate a column where data in the column is non-numerical or stored in a different manner. For example, if a status value column stored at server computer 110 includes, for each row, one or more diagnosis codes for diagnoses corresponding to a personal data record, the server computer 110 may generate a column for a particular diagnosis code by including, in each row of the column, a "0" value if the row did not include the particular diagnosis code and a "1" if the row did include the particular diagnosis code.

At step 222, server computer 110 sends the machine learning system to media server 150. In an embodiment, server computer 110 validates one or more of the training dataset used to train the machine learning system or the trained machine learning system using the methods described herein prior to sending the machine learning system to media server 150. The trained machine learning system may be sent in a form that is readily usable by media server 150, such as a matrix of weights for the machine learning system.

At step 224, media server 150 uses the machine learning system to determine whether to send media to a client computing device. For example, media server 150 may receive attribute data for the client computing device. The attribute data may include values for each attribute that was used to train the machine learning system. Media server 150 may use the machine learning system to compute, from the attribute data for the client computing device, a likelihood of existence of the status. Based on the likelihood of existence of the status, media server 150 may send a related media item to the client computing device. For example, media server 150 may determine whether the likelihood is greater than a threshold value and, if the likelihood is greater than the threshold value, send the media item to be displayed on the client computing device.

1.4 Protected Environment Implementation

Figure 3:
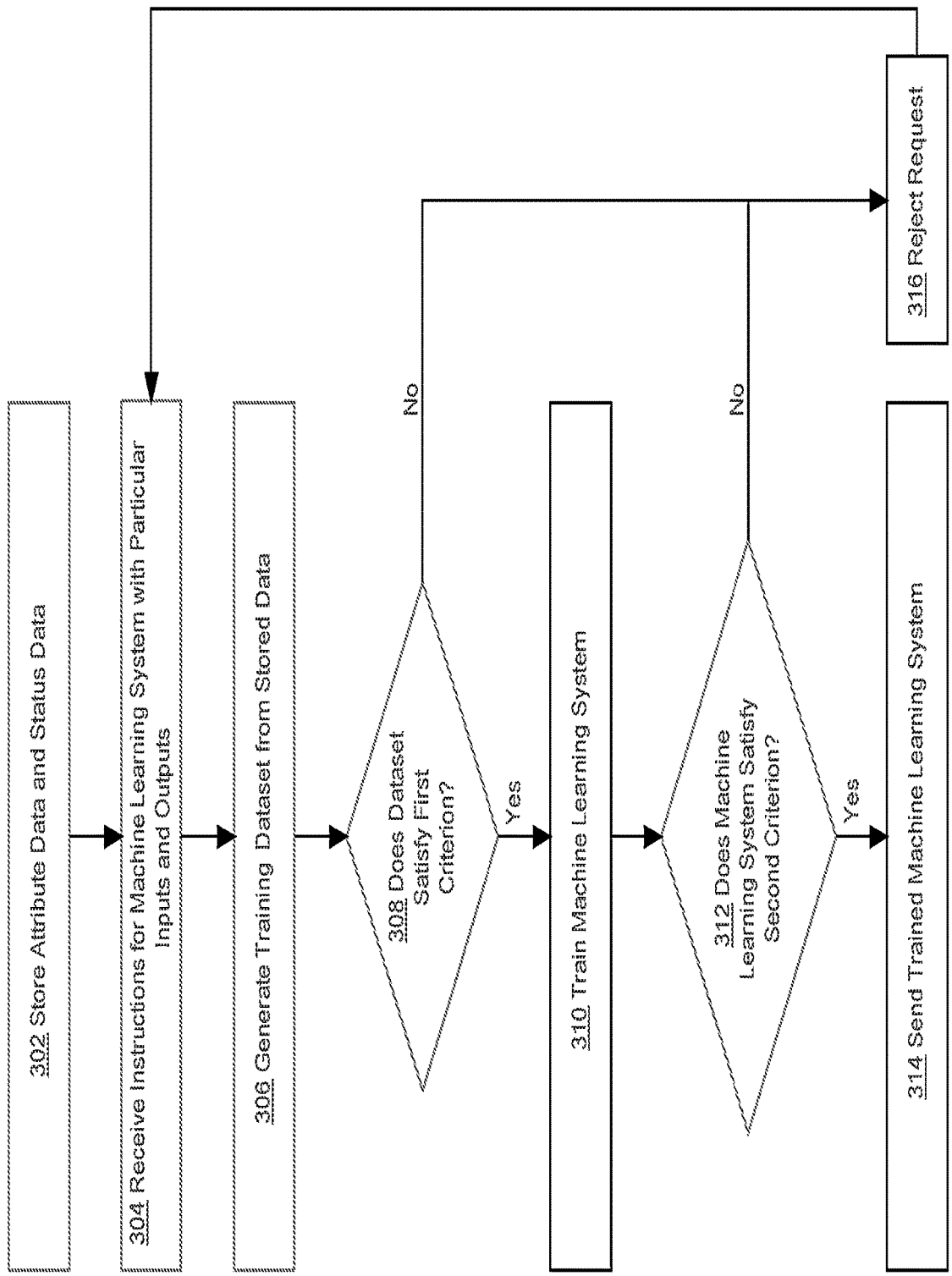
FIG. 3 depicts an example method for building and validating a machine learning system in a protected environment.

FIG. 3 depicts an example method for building and validating a machine learning system in a protected environment.

At step 302, a server computer within a protected environment stores attribute data and status data. For example, the server computer may store a plurality of columns of data, each column corresponding to a different attribute with values in each row indicating an attribute value for a particular personal data record. The server computer may additionally store one or more columns of data identifying status values, such as ICD-10 codes.

At step 304, the server computer receives instructions to generate a machine learning system with particular inputs and outputs. The instructions may identify which attributes to use as inputs and presence or absence of a status value as an output. For example, instructions may specify inputs as age, gender, weight, and height and an output as presence or absence of the ICD-10 code for Type 2 Diabetes. The instructions may also identify parameters for the machine learning system, such as a number of layers or number of nodes. Additionally or alternatively, the server computer may store parameters for the machine learning system and/or be configured to vary parameters for the machine learning system in response to the machine learning system failing to satisfy one or more criteria.

At step 306, the server computer generates a training dataset from stored data. For example, the server computer may initially identify personal data records that have values for each of the selected inputs. For example, some personal data records may lack a value for 'age' or 'gender' and may thus not be used to generate a training dataset if the instructions identified age and gender as inputs. The server computer may generate a training dataset for a plurality of personal data records with attribute values set as inputs and existence or non-existence of a status value as the output. For example, if the output was specified as existence of a particular ICD-10 code, then outputs for personal data records which included the particular ICD-10 code may be set to 1 while outputs for personal data records which did not include the particular ICD-10 code may be set to 0.

In an embodiment, generating the training dataset comprises selecting a subset of the stored data which could be used to generate the training dataset. For example, if three thousand data records include the required attributes, the server computer may select less than the three thousand data records to train the machine learning system. The number of records used may be identified in the received instructions and/or may be a stored percentage value. For instance, the server computer may be configured to only use half of the available records. Additionally or alternatively, the server computer may select records such that a minimum number of records with the output are used for training and a minimum number of records with the records are not used for training, thereby ensuring that the machine learning system is unable to memorize all stored personal data records.

At step 308, the server computer determines whether the dataset satisfies a first criterion. The first criterion may comprise a minimum number of instances of a positive value for the output. The server computer may be configured to determine whether there are at least a threshold number of instances of personal data records with the status value as an output. For example, if the output value is a particular ICD-10 code, the server computer may determine if at least a threshold number of data records in the stored data which can be used to build the training dataset comprise the particular ICD-10 code. The threshold number may be a value stored at the server computer or identified in the received instructions. The first criterion may additionally or alternatively include a minimum number of instances of personal data records without the status value as an output, a minimum and/or maximum ratio between personal data records with the status value as an output and data records without the status value as an output, and/or a minimum number of remaining data records that were not used in the generation of the training dataset that include the status value and/or do not include the status value.

Step 308 may be performed before the generation of the training dataset, thereby determining whether a training dataset generated from the stored data could satisfy the first criterion. For example, if the first criterion is a minimum number of instances of a particular ICD10 code, the server computer may initially identify each data record which could be used to generate the training dataset and determine whether a number of the data records meets or exceeds the minimum number. In an embodiment, the server computer determines whether the stored data includes the minimum number of instances of the status value generally in addition to determining whether the stored data which could be used to build the training dataset includes the minimum number of instances of the status value. Thus, the server computer may distinguish between whether any training dataset could meet the first criterion when using the identified status value as an output or whether a training dataset using the requested attributes as inputs could meet the first criterion when using the identified status value as an output.

If the dataset does not satisfy the first criterion, at step 316 the server computer rejects the request for a machine learning system. For example, the server computer may send data to a requesting computing device rejecting the request for the machine learning system. The rejection may state that the first criterion was not satisfied. In an embodiment, the rejection additionally identifies whether the first criterion could be satisfied with different inputs, such as when a minimum number of instances of the output status value exists, but does not exist in records which comprise attribute values for the requested inputs.

If the dataset does satisfy the first criterion, at step 310 the server computer trains a machine learning system using the training dataset. For example, the server computer may generate a new machine learning system using received and/or stored values for the parameters of the machine learning system. The machine learning system may comprise a logistic regression model, neural network, random forest model, gradient boosted decision tree, and/or any machine learning system which can be used to solve a classification problem. In an embodiment, the received instructions specify a type of machine learning system to train from a plurality of types of machine learning systems. For example, the server computer may store instructions for generating any of a plurality of machine learning systems. The server computer may receive instructions specifying which of the plurality of machine learning systems to generate and train. The server computer may generate the machine learning system using stored parameters and/or received parameters and train the machine learning system using attributes for personal data records as inputs and a value indicating existence or non-existence of a particular status as outputs.

At step 312, the server computer determines whether the machine learning system satisfies a second criterion. The second criterion may relate to an accuracy of the machine learning system, thereby ensuring that the machine learning system is unable to memorize inputs completely. For example, the second criterion may be a maximum average computed percent chance of the status value when using the machine learning system to compute outputs for the input training datasets which included the status as an output.

In an embodiment, the second criterion comprises a minimum fraction of population at risk based on the machine learning system. For example, the server computer may use the trained machine learning system to compute outputs for a plurality of input datasets. The input datasets may include datasets generated from stored data that was not used to train the machine learning system, datasets that were used to train the machine learning system, and/or datasets received with the initial instructions to generate and train the machine learning system. The server computer may then compute a fraction of population at risk based on a number of positive outputs from the plurality of input datasets and/or a number of instances in the training dataset of a positive status value. An example equation may comprise:

$$R = -T/P$$

where R is the fraction of the population at risk T is the number of instances in the training dataset of a true positive for the output value, and P is the number of positive predictions from using the machine learning system on the plurality of input datasets. The server computer may store a maximum threshold value for R as the second criterion, such as 0.2. Thus, if R is greater than 0.2, the server computer may determine that the machine learning system does not satisfy the second criterion.

If the machine learning system does not satisfy the second criterion, at step 316 the server computer rejects the request for a machine learning system. For example, the server computer may send data to a requesting computing device rejecting the request for the machine learning system. The rejection may state that the second criterion was not satisfied. In an embodiment, the server computer, after sending the rejection, may receive another request to generate a machine learning system. If the rejection was received based on the first criteria, the server computer continues with step 306. If the rejection was received based on the second criteria and the selected inputs and outputs remained the same, the server computer may skip checking the first criteria which is known to be satisfied. For example, the second request may specify the same inputs and outputs but vary the parameters for training the machine learning system in an attempt to decrease its accuracy or the percentage of the population at risk. The server computer may generate a new machine learning system with the new parameters, train the new machine learning system with the same training dataset, and determine whether the new machine learning system satisfies the second criterion.

If the machine learning system satisfies the second criterion, at step 314 the server computer sends the trained machine learning system to the requesting computing device. For example, the server computer may release the trained machine learning system from the protected environment to the requesting device in response to determining that all criteria have been satisfied. The trained machine learning system may comprise weight values for each of the columns without including any of the training data used to create the trained machine learning system, thereby providing protection of personal data while still providing a machine learning system trained based on the personal data. As the server computer is configured to perform these tasks without allowing any external access to the data stored in the server computer, the server computer provides a means for utilizing protected or personal information without providing any knowledge of the protected or personal information.

1.5 Media Server Implementation

Figure 4:
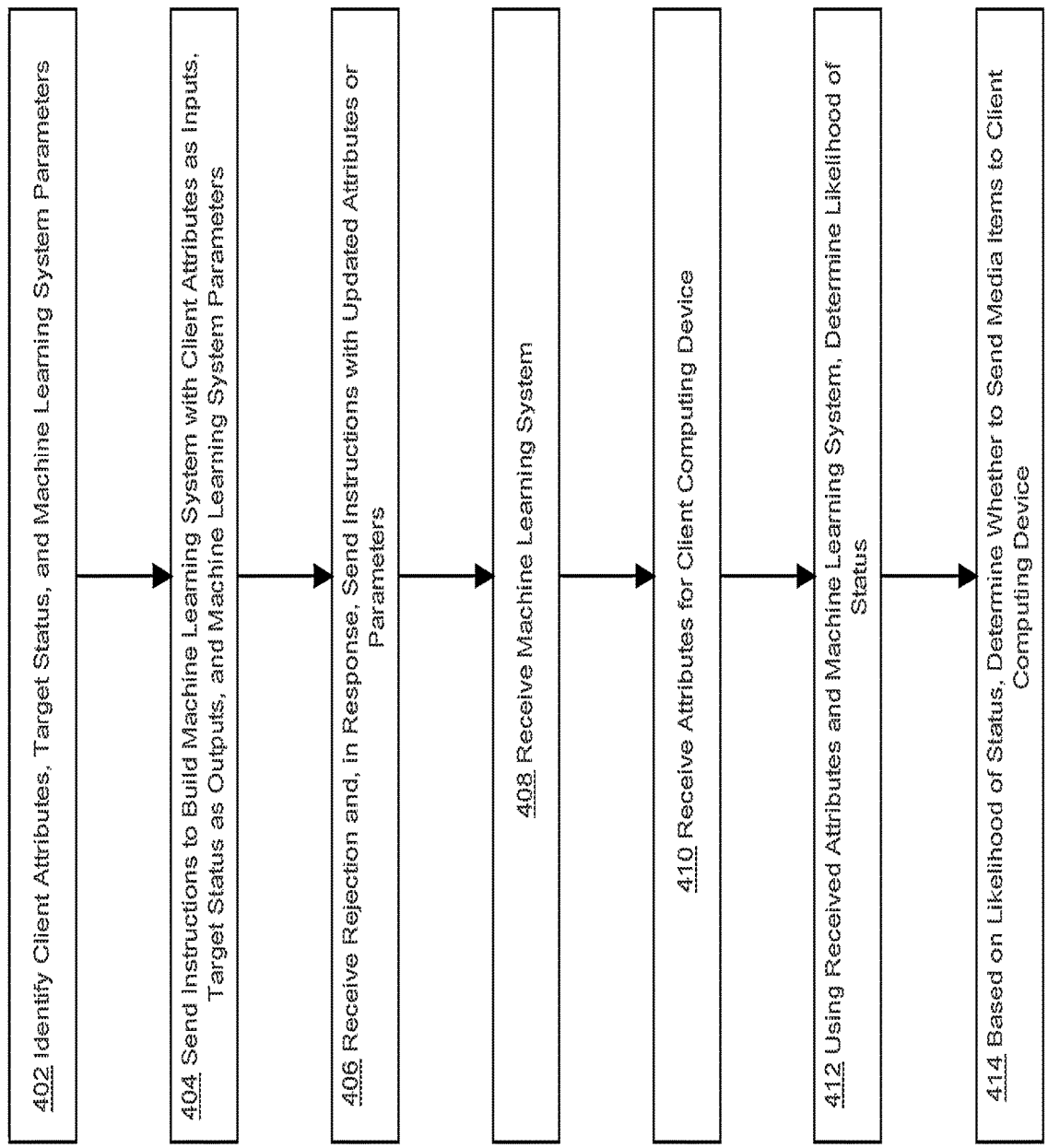
FIG. 4 depicts an example method for utilizing a secure environment to build and validate machine learning systems.

FIG. 4 depicts an example method for utilizing a secure environment to build and validate machine learning systems.

At step 402, a media server identifies client attributes, a target status, and machine learning system parameters. For example, the media server may receive input specifying client attributes for inputs and a target status as the output. The media server may additionally receive input specifying the machine learning parameters. Additionally or alternatively, the media server may store initial machine learning parameters. In an embodiment, the media server further receives input specifying a type of machine learning system to build.

At step 404, the media server sends instructions, to a secure environment, to build a machine learning system with the identified client attributes as inputs, target status as outputs, and the machine learning system parameters. For example, the media server may send instructions through an API of a server computer executing the secure environment to build a machine learning system, the instructions identifying the attributes to use as inputs and the status value to use as the output.

At optional step 406, if the media server receives a rejection, the media server, in response, sends instructions with updated attributes or parameters. The media server may receive a rejection if training data or the machine learning system failed to meet one or more criteria. The media server may cause display of an error message and request different inputs, outputs, and/or parameters to send to the server computer. In an embodiment, the media server may be configured to vary parameters for the machine learning system when an error is received based on the machine learning system failing to meet one or more criteria. For example, the media server may be configured to change a number of nodes or a number of layers pseudo-randomly and/or based on a stored second set of parameters.

At step 408, the media server receives a trained machine learning system. For example, the media server may receive the trained machine learning system from the secure environment when the machine learning system has satisfied stored criteria. The media server may store the machine learning system and identifiers of the attributes used as inputs and status used as the output for the machine learning system.

At step 410, the media server receives attributes for a client computing device. The media server may be configured to determine whether to serve a particular media item to the client computing device. For example, the media server may be configured to determine which computing devices to send an advertisement for a diabetes medication. The media server may receive the attributes for the client computing device prior to the steps 402-408 or after. For example, the media server may store attributes for a plurality of client computing devices prior to receiving a request for media to be sent to the client computing device.

Additionally or alternatively, the media server may request attribute data from an outside source, such as an attribute database, based on information received from the client computing device. For example, the media server may receive a request to display media on a client computing device, such as in response to a client computing device navigating to a particular webpage. The media server may additionally receive data from the client computing device or from an external source which the media server may send to the attribute database with a request for attributes of the client computing device. The request may specify the attributes used to train the machine learning system.

At step 412, the media server uses received attributes and the machine learning system to determine a likelihood of a status. The media server may use the attributes as inputs into the machine learning system to compute an outcome value indicating a likelihood of the status. Thus, if the machine learning system was trained using a diagnosis of Type 2 Diabetes as the output, the media server may use the attributes to compute a likelihood of Type 2 Diabetes based on the input attributes. The server computer may compute the likelihood of the status in response to receiving a request for media and/or in advance of receiving the request. For example, the server computer may compute likelihoods for a plurality of client computing devices and store the likelihood values to be used later.

In an embodiment, the media server performs steps 402-412 a plurality of times for a single client computing device. For example, the media server may request a plurality of machine learning systems from a protected environment, each trained with a different status value as the output. The media server may use the plurality of trained machine learning systems to compute a plurality of likelihood values, each corresponding to a different status. The media server may store the plurality of likelihood values for use in determining which media item to send to a client computing device.

At step 414, based on the likelihood of the status, the media server determines whether to send media items to the client computing device. For example, the media server may store a media item corresponding to a particular status. The media server may determine whether the likelihood of the status for the client computing device is greater than a stored threshold value, such as 80%. If the likelihood is greater than the stored threshold value, the media server may send the media item to the client computing device. If the likelihood is not greater than the stored threshold value, the media server may send a different media item to the client computing device.

In an embodiment, the media server selects one of a plurality of media items based on a plurality of likelihood values. For example, the media server may store a plurality of media items, each corresponding to one or a plurality of statuses. The media server may use a plurality of machine learning systems, each trained with one of the plurality of statuses as an output, to compute a plurality of likelihoods of a status for the client computing device. The media server may identify the status with the highest likelihood and select the media item corresponding to the identified status. The media server may then send the selected media item to the client computing device.

In an embodiment, the media server uses the likelihood of the status to determine a value for one or more media items. For example, the media server may receive a request to send a plurality of media items, such as one thousand media items, to client computing devices corresponding to personal data records with the status value. If the likelihood of the status for a particular personal data record is 50%, the media server may value sending the media item to the client computing device as being valued as one half of a personal data record corresponding to the status. Thus, if the request was for one thousand media items to be sent to client computing devices corresponding to personal data records with the status value, the media server may send media items to client computing devices until a value of personal data records sent corresponds to one thousand, such as two thousand media items being sent to client computing devices corresponding to personal data records with a 50% likelihood of the status value. Additionally or alternatively, the media server may use the likelihood of the status to dynamically price sending media items to client computing devices. For example, if a price for sending a media item to a client computing device corresponding to a personal data record with the status value is $10, the media server may charge $5 for sending the media item to a client computing device corresponding to a personal data record with a 50% likelihood of the status value.

1.6 Outcome Implementation

In an embodiment, the systems and methods described herein may be used to identify effects of particular actions on a status of a personal data record while protecting the used information. For example, the server computer may determine, within the protected environment, a percentage of identified personal data records with a particular status or a percentage of identified personal data records which received a benefit based on a request from an external computing device, such as the media server. Embodiments are described further herein.

In an embodiment, the server computer determines a percentage of identified personal data records with a particular status. For example, after sending media items to a plurality of client computing devices, the media server may store identifiers for a plurality of personal data records corresponding to computing devices which received media items corresponding to a particular status, such as cookie identifiers. The media server may send to the server computer, the identifiers and an identification of the particular status. In an embodiment, the media server generates unique tokens for the plurality of personal data records using the methods described herein and sends the generated unique tokens to the server computer with an identification of the status. The server computer may match the received identifiers to personal data records stored in the protected environment, such as through a mapping of cookie identifiers to personal data records. The server computer may then determine, within the protected environment, for each identifier, whether the identifier corresponds to the particular status. As an example, the server computer may determine whether a particular ICD-10 code is listed in a row corresponding to the personal data record. The server computer may determine a number and/or percentage of identifiers that correspond to the particular status and send the number and/or percentage to the media server.

In an embodiment, the server computer may be configured to only send the number or percentage of identifiers from the protected environment in response to determining that the number and/or percentage satisfies a third criterion. The third criterion may be a minimum number of total identifiers, a maximum number and/or percentage of identifiers with the particular status, or a minimum number or percentage of identifiers with the particular status. By using a third criterion, the server computer may ensure that protected information is not released to the media server.

In an embodiment, the server computer is configured to determine a benefit for one or more personal data records based on additional received claims data. For example, the claims processor may send additional claims data to the server computer. The server computer may receive the additional claims data and correlate the additional claims data with previously stored claims data, such as through unique identifiers generated by the claims processor. The server computer may additionally receive data from the media server comprising a plurality of identifiers of personal data records corresponding to computing devices which received a media item corresponding to a particular status. The server computer may determine, from the plurality of identifiers of personal data records and the received additional claims data, a number and/or percentage of personal data records which received a benefit. A benefit, as used herein, comprises a determination made by the server computer of a change in a status of a personal data record that has been defined as beneficial. Definitions used by the server computer as a "benefit" are further described herein.

In an embodiment, a benefit is defined as an additional status corresponding to the personal data record. For example, the server computer may receive an identification, from the media server, of a prescription code for a medication corresponding to a sent media item. The server computer may determine, from the additional claims data, whether any of the personal data records corresponding to the identifiers received from the media server comprise the prescription code for the medication. The server computer may compute a number and/or percentage of the identifiers which correspond to personal data records that comprise the prescription code in the additional claims data and send the number and/or percentage to the media server.

A benefit may also be defined as removal or change of a status in corresponding data records. For example, the server computer may be configured to determine a benefit has occurred if the particular status is listed as removed in future data records, has been changed to a status identified by the media server, such as a less severe version of a disease, or if a different status, such as a prescription for a pain medication, has been removed, thereby indicating that pain management is no longer necessary. In an embodiment, the benefit may be defined by a number of claims, such as a decrease in a number of doctor visits or a decrease in refills of a prescription.

In an embodiment, the benefit is defined by a request from the media server. For example, the media server may send a request to the server computer comprising a plurality of identifiers and one or more statuses and/or status changes for the plurality of identifiers. As a practical example, the media server may send a request for identification of a number and/or percentage of identifiers sent by the media server that correspond to personal data records which had a removal of a particular status in additional claims data. The server computer may identify, of the identifiers sent by the media server, each identifier that initially corresponded to the particular status. The server computer may then identify, of the identifiers that corresponded to the particular status, which identifiers had a removal of the particular status in the future claims data. The server computer may then send a number or percentage of received identifiers that had the removal of the particular status in future claims to the media server.

2. Planner Process—System Overview

According to one embodiment, a planner process can be programmed for integration with the modeled audience systems and functions that have been described in the preceding sections. In an embodiment, the planner process can be programmed with functions to explore, create, export and activate a clinically relevant audience, reaching potential patients within a short period. Embodiments can be programmed as a self-service application to help marketers or other users understand potential reach of digital advertising campaigns using one or more data sets to provide clinically relevant messaging to potential patients. Embodiments can be programmed for building a HIPAA compliant audience, including modeled audiences, exploring the reach and overlap of various audiences, recommending the optimal combination of audiences based on user objectives and exporting one or more audiences or segment data to any target for activation or analysis.

For example, an audience can be exported to a streaming television media provider and measurement can be accomplished by receiving a log of user interactions with various media from the same provider. Embodiments also can be used for generating online audience estimates without initiating an activation. For example, embodiments can be used or programmed for forecasting by accessing data from other data providers and the data of the service provider, and match that data to de-identified health data to determine potential media reach, such as the online presence of clinically relevant consumers. Or, embodiments can be used to estimate counts of verified individuals within the data have one or more relevant attributes; for example, the estimated count of verified patients within the dataset can be determined. Such a verified count can lead to estimates of data quality, as a larger ratio of verified patients to all individuals represented in a dataset means that dataset has higher quality. Or, an embodiment can be programmed to execute benchmarking of third-party audience segments by executing forecasting or reach estimation both for audience segments received from third-party sources and for data natively or locally available in the system of the disclosure; comparing reach estimates can yield data indicating whether third-party audience segments could out-perform native data, or the converse.

Throughout this disclosure, the term "target for activation" can refer to any of the following: demand-side platform, supply-side platform, or any other system designed to serve advertisements or media, plan or build audiences, analyze datasets, and otherwise use health data. An "audience" can comprise one or more destinations, subject to privacy controls or in a de-identified manner; that is, an audience need not be a large mass of destinations but could represent a single device or individual in a de-identified manner. "Health data," throughout this disclosure, can refer to any data of an individual related to their health, which could include medical, clinical, and prescription codes, health information shared with individual applications or software, insurance-related information, doctor visitations, or other data from healthcare institutions or consumer-facing health devices, applications, and websites, the use of which is subject to the careful consideration and implementation of necessary security and privacy controls in compliance with HIPAA and other privacy law standards.

Throughout this disclosure, "master data" can mean a single dataset or one or more decentralized data sets that may be combined to create a federated dataset. Further, throughout this disclosure, "demographic data" includes demographic segments and may also include geographic location data of an individual, including but not limited to an address, latitude-longitude (lat-long) data, GPS coordinates, DMA (designated marketing area), ZIP code, city, county, or another geographical unit.

For purposes of illustrating a clear example, this description refers in some cases to working with data indirectly relating to patients of healthcare providers. However, patient planning is only one example domain in which the general principles of the disclosure can be applied, and other embodiments could be applied to data relating to other kinds of individuals, accounts, or situations in which security or privacy is important. Other use cases include setting advertising targeting parameters, and clinical research or analytics including combining health data with customer relationship marketing (CRM) data. Specific embodiments of a planner process, computer program product with instructions for implementing a planner process, and a distributed computer system supporting a planner process, can include the subject matter of the following numbered clauses:

1. A computer implemented method comprising: receiving and storing in relational database tables in a secure data processing environment comprising one or more first virtual machine instances coupled to one or more first data stores, master data comprising records having first de-identified token values associated with health data and second data comprising records having second de-identified token values associated with historical media delivery data; in the secure data processing environment, executing one or more database table join operations to merge the master data and the second data to produce a joined table having records comprising third de-identified token values associated with the health data and the second data; receiving, using one or more virtual computing instances of a service provider environment, one or more filter specifications that define a target audience and a forecast request, and in real time in response to the forecast request: based on the one or more filter specifications, executing one or more queries to the joined table in the secure data processing environment; receiving, in the service provider environment, de-identified aggregated data that the secure data processing environment has generated based upon the one or more queries to the joined table; based on the de-identified aggregated data and second data, generating an estimate of media delivery reach; presenting the estimate of the media delivery reach to a user computer that is communicatively coupled to the service provider environment.

2. The method of clause 1, further comprising generating the estimate of media delivery reach as an estimate of one of: media delivery reach to the target audience; an estimate of a number of interactions the target audience may take with delivered media; an estimate of a number of behaviors the target audience may perform after viewing deliver media.

3. The method of clause 1, the second data comprising any one or more of: advertising data; media data; individual data; demographic data; historical digital advertising data comprising any of media deliveries or impressions, opportunities, or clicks; television ACR data.

4. The method of clause 1, further comprising: receiving and storing in relational database tables in a secure data processing environment comprising one or more first virtual machine instances coupled to one or more first data stores; the master data comprising first records having first de-identified token values associated with health data; the second data comprising second records having second de-identified token values associated with demographic data; third data comprising third records having third de-identified token values associated with historical media delivery data comprising one or more of television ACR data, impressions, opportunities, and clicks; executing the one or more database table join operations to merge the master data, the second data, and the third data to produce the joined table having records comprising fourth de-identified token values associated with the health data, the demographic data, and the historical media delivery data.

5. The method of clause 1, further comprising receiving the master data from one or more data sources separate from the secure data processing environment.

6. The method of clause 1, the joined table comprising records having first de-identified token values associated with demographic data and health data for one or more of: clinical medical data, prescription data specifying drug prescriptions, and/or medical clauses data.

7. The method of clause 1, the master data comprising a single dataset or one or more decentralized data sets that combine to create a federated dataset.

8. The method of clause 3, the demographic data comprising one or more of demographic segments, gender, and age and geographic location data of an individual, the geographic location data including but not limited to an address, latitude-longitude (lat-long) data, GPS coordinates, DMA (designated marketing area), ZIP code, city, county, or another geographical unit.

9. The method of clause 1, further comprising transmitting the filter specifications that define a target audience to one or more targets for activation that serve media to cause presentation of a targeted media delivery on a computer associated with members of the target audience.

10. The method of clause 9, the filter specifications being transmitted with instructions for use by one or more of an advertising exchange, media server and/or media and advertisement display channel.

11. The method of clause 1, further comprising receiving the historical digital media delivery data and/or opportunities data from the advertising, data, and media platform or system; receiving the demographic data from a demographic data service provider separate from the service provider environment; calling a third-party token service to generate the second de-identified token values for the demographic data to associate the second de-identified token values with demographic segments, and to generate the third de-identified token values for the historical media delivery data that associates third de-identified token values with one or more of media deliveries or impressions, opportunities, and clicks; programmatically copying the demographic data and historical media delivery data to a first data store in the secure data processing environment.

12. The method of clause 1, further comprising receiving the historical digital media delivery data and/or opportunities data from the platform; receiving the demographic data from a demographic data service provider separate from the service provider environment; generating the second de-identified token values for the demographic data to associate the second de-identified token values with demographic segments, and generating the third de-identified token values for the historical media delivery data that associates third de-identified token values with one or more of media deliveries or impressions, opportunities, and clicks; programmatically copying the demographic data and historical media delivery data to a first data store in the secure data processing environment.

13. The method of clause 1, further comprising generating and displaying a graphical user interface that is programmed to receive input from the user computer specifying filter attributes for one or more of: for health data by diagnosis, prescription drug use or procedure, for healthcare system interactions such as in-office healthcare provider visitations or telehealth visitations, for health insurance coverage, for health insurance providers, for genetic information, for survey responses, for geography, for demographic attributes, for ad opportunities, for media deliveries or impressions, for ACR, for diagnosis codes, for prescription drug codes, and for procedure codes, by publisher, by media owner, by media and advertising platform, by data provider.

14. The method of clause 5, the advertising, data, and media platform or system being programmed for generating instructions for ranking media deliveries or impressions based upon one or more of target procedure codes, target diagnosis codes, counts of unique patients, or estimated numbers of media deliveries or impressions; generating instructions for submitting bids for purchasing media deliveries or impressions based upon the ranking of the media deliveries or impressions.

15. The method of clause 1, the master data comprising records having first deidentified token values associated with health data.

16. The method of clause 1, the master data comprising records having first deidentified token values associated with any of: medical clinical codes comprising any of International Statistical Classification of Diseases and Related Health Problems (ICD) codes, Current Procedural Terminology (CPT) codes, Healthcare Common Procedure Coding System (HCPCS) codes, J codes, or National Drug Code (NDC) codes for prescriptions, or LOINC codes for laboratory tests.

17. The method of clause 1, further comprising: receiving a query that specifies one or more filter criteria; based on the one or more filter criteria, and based on the de-identified aggregated statistics data and historical media delivery data from an advertising, media, or data platform or system, generating an updated estimate of the number of media deliveries or impressions that the advertising, media, or data platform or system can deliver to the target audience or an updated estimate of a number of interactions the target audience may take with delivered media or an updated estimate of a number of behaviors the target audience may perform after viewing deliver media; presenting the updated estimate and the de-identified aggregated statistics data to the user computer.

18. The method of clause 1, further comprising the ability to forecast the delivery of digital content such as digital advertisements, optionally including data specifying a distribution or counts of potential media deliveries or impressions, clicks, or other interactions, or delivery of digital advertisements to one or more specified media channels, applications, or websites, by publisher, by media owner, by media or advertising platform, or by data provider.

19. The method of clause 1, further comprising: based on the de-identified aggregated statistics data and historical media delivery data from an advertising, media, or data platform or system, generating: two or more estimates of numbers of media deliveries or impressions that the advertising, media, or data platform or system can deliver to two or more different target audiences that match the health data, or two or more estimates of numbers of interactions that two or more target audiences that match the health data may take with delivered media, or two or more estimates of numbers of behaviors that two or more target audiences that match the health data may perform after viewing deliver media; presenting the two or more estimates and the de-identified aggregated statistics data to the user computer concurrently.

2.1 Structural Overview

FIG. 6 is a data flow diagram that illustrates example function elements of a distributed computing system that can implement an embodiment of a planner service. For purposes of illustrating a clear example, FIG. 6 shows an embodiment in which various functional elements are divided among a plurality of different network environments, including service provider environments 603A, 603B and HIPAA compliant secure health data processing environments 620A, 620B. Further, in an embodiment, processing in environments 603A, 620A can be distinguished from processing in environments 603B, 620B primarily because the former function to support responses to real-time queries, and the latter are used for offline, non-real-time preparation before queries are received. However, in other embodiments, one or more of the environments can be combined or integrated, and a single entity, enterprise, or service provider could implement, own, manage, or control all the environments together. Different environments can be defined logically using a combination of network controls such as routing tables, access control lists, security permissions, IAM permissions, etc.

In various embodiments, the system of FIG. 6 also can interoperate with one or more other systems, applications, or processes that implement one or more modes of activation. As one example, activation can comprise querying data produced via FIG. 6 and programmatically providing a result set from the query to a secure ML-based audience modeling system, although working with an audience modeling system is not required. Other modes of activation are described in other sections of this disclosure.

In an embodiment, a user computer 602 is coupled directly or indirectly via one or more networks to a service provider environment 603A. The service provider environment 603A can be a data processing environment that is controlled and/or owned or operated by an entity that is distinct from the owner or operator of a HIPAA-compliant secure health data processing environment 620A, for security, control, and/or regulatory reasons. In an embodiment, each of the data processing environments 603A, 620A is implemented independently in one or more private datacenters, public datacenters, and/or virtual computing environments or cloud computing facilities. The secure environment 603A can be implemented using one or more first virtual machine instances of a cloud computing facility. The service provider environment 603A can be implemented using one or more second virtual computing instances of a cloud computing facility.

The term "HIPAA-compliant secure health data environment" is used for environment 620A as one example of a secure data processing environment that can be implemented, but other embodiments can be implemented in compliance with policies, rules, regulations, laws, or other constraints other than HIPAA. The HIPAA-compliant secure health data environment 620A enforces program-based controls to prevent unauthorized access to a data store denoted media data 624 and cloud storage system 626 within the environment, including password protection or other authentication, firewalls, API keys, and other software-based security techniques. The media data 624 can be programmed to receive and store one or more of advertising data, media data, individual data, demographic data, historical digital advertising data comprising any of media deliveries, impressions, opportunities, or clicks, or television ACR data for use as further described.

Service provider environment 603A can comprise a user interface 604 that interoperates with user computer 602 and is programmatically linked to planner service instructions 606, which is programmatically linked to a forecasting engine 608. Each of the user interface 604, planner service instructions 606, and forecasting engine 608 can be implemented using one or more sets of executable instructions, programs, methods, or functions that virtual machine instances of the service provider environment 603A execute.

Planner service instructions 606 also are coupled to a media data store 612, which receives data programmatically from a processing platform 610 or from one or more other external sources. In various embodiments, the platform 610 can be a DSP, SSP, or Publisher, or any other advertising, data, and media platform or system. Media data 612 can be programmed with a table schema to store historical digital advertising data comprising any of media deliveries, impressions, opportunities, or clicks, or television ACR data specifying which digital content items have been presented to external systems such as the computers or devices of persons such as patients. The media data 612 can deliver media data on a historical data basis to the planner service instructions 606 in response to queries, calls, or requests. In various embodiments, data for media deliveries can represent media deliveries or digital advertising that has been presented via digital devices, linear channels, connected televisions (CTVs), or other sources; for example, automatic content recognition (ACR) data can be obtained from certain suppliers of CTVs and used to analyze the incremental reach of digital advertising for specific patient populations on CTV as compared to linear based on the combination of ACR data with claims data.

The elements of service provider environment 603A just described can be programmed to interoperate to provide real-time query and response functions for use in campaign planning. Example processes of real-time use are further described herein in connection with FIG. 7. The service provider environment 603A can be integrated with or associated with other elements that are useful in offline data preparation using batch processing or similar techniques to prepare various datasets for use in real-time execution at another time. "Offline," in this context, refers to function elements that access, obtain, collect or store datasets that relate to concrete, real-world sources such as health data in the form of clinical data or claims data, location data, insurance data, and demographic data. For clarity, the offline data preparation elements are shown in a separate service provider environment 603B, but in some embodiments, the environments 603A, 603B are co-located, co-hosted, or otherwise integrated and separate environments are not required.

Referring now to service provider environment 603B, the platform 610 is programmatically linked to a first data store 632 and can be programmed to provide digital media delivery and opportunities data to the first data store 632. For reasons of storage capacity and/or response time, a second data store 634 can be configured to store historical media delivery data, which can be organized as token values associated with values for media deliveries or impressions, opportunities, and clicks. A third data store 636 can be configured to store demographic data, which can be organized as token values associated with a list of segments. For example, in various embodiments, the data store can include one or more of: 1) historical media delivery and opportunities data (including impressions, opportunities, clicks); 2) a list of demographic segments and/or other demographic data; 3) ACR data or other audience onboarding data; 4) user data (for example, hashed emails, MAIDs, IP addresses, third-party identifiers, household identifiers, online individual identifiers or internet identities; 5) location-based data such as address, ZIP codes or DMAs of individuals, including user-provided ZIP codes or other data rather than data elements that have been previously tied to demographic data; 6) publisher first party data (web, mobile, CTV, and other media channel data, including user analytics, content use or interaction data).

In some embodiments, the first data store 632 is implemented using a facility that provides good response time for larger data storage, such as SPARK. In an embodiment, the second data store 634 is implemented using a fast, cloud-based repository for smaller datasets such as BIGQUERY, and the third data store 636 is implemented using a slower, large-scale, longer-term repository such as AMAZON S3. Other embodiments can use different systems or means of configuring or implementing the data stores depending on the size of datasets and desired response time. Certain embodiments can use all of data store 632, 634, 636, or one or more of them, in any combination. Data store 632, 634 can store CRM data, business relationship data, or other relationship data, for example, for combining with health data for use in clinical research and analytics.

Planner service instructions 606 also are coupled to a wrapper service 622 in the HIPAA-compliant secure health data environment 620A, which is programmatically linked to the media data 624. In one embodiment, environment 620A hosts a plurality of different wrapper service instances, each of which is associated with a different service provider. In the example of FIG. 6, a single wrapper service 622 is shown and is associated with a service provider of the service provider environment 603A. The wrapper service 622 can be programmed with one or more programs, methods, APIs, or other software elements that implement functions specific to the service provider of the service provider environment 603A. Different instances of a wrapper service can implement different applications for different service providers. The wrapper service 622 provides executing queries against the media data 624 with logic specific to a particular service provider within the secure environment 620A without giving the service provider or the functional elements of the service provider environment 603A direct access to the media data 624 and cloud storage system 626. The wrapper service 622 can implement an API that is callable from the service provider environment 603A and can wrap any desired application, method, or program that is useful to the service provider and needs access to secure data in the secure environment 620A. In some embodiments, wrapper service 622, media data 624, and cloud storage system 626 can function as a single integrated data store and separate functional elements are not required in all embodiments.

Each of the click data store 614 of service provider environment 603A and media data 624 of the secure environment 620A can be implemented using a fast open-source column-oriented database management system that allows generating analytical data reports in real-time using SQL queries for aggregation or other purposes. A commercially available example is CLICKHOUSE from ClickHouse, Inc. The cloud storage system 626 can comprise an object storage service with high scalability, data availability, security, and performance. A commercially available example is AMAZON S3 from Amazon, Inc.

In one embodiment, the wrapper service 622 and media data 624 are programmed to periodically query the cloud storage system 626 to move data records from the cloud storage system to the media data 624; records can comprise a token to deidentify a record, and the substantive data in the record. In one embodiment, the health data can comprise one or more of clinical medical data, prescription data specifying drug prescriptions, and/or medical claims data. For example, the process codes can be any of ICD codes, CPT codes, HCPCS codes, J codes, or NDC codes for prescriptions, but other embodiments can use codes or coding for domains other than healthcare. In one embodiment, token values can be obtained from an external personal data record tokenizing system. The token values are HIPAA compliant and allow linking health data with historical delivery data set and demographic attributes. One example of a commercial provider of token values is DATAVANT. This approach ensures that all records that eventually enter the service provider 603A exclude all personally identifiable information (PII) and instead carry a unique token value that can be used as a search key and to merge and join other records but is not traceable to a particular person or user account.

The opportunities statistics data can comprise data values relevant to digital advertising presentation such as creative types, viewability values, and device type values. In an embodiment, the viewability data can support computing a forecast of media delivery with a certain viewability threshold. Examples of commercial providers of viewability data are INTEGRAL AD SCIENCE and DOUBLEVERIFY. The demographic data can comprise values for age, gender, and location. The clinical codes can comprise any of the healthcare codes identified elsewhere in this disclosure that have been used in clinical encounters with the person represented by the token in the past one year and past five years, or for other time intervals in other embodiments.

The elements of secure environment 620A just described can be programmed to interoperate to support real-time query and response functions for use in campaign planning as further described herein in connection with FIG. 7. The secure environment 620A can be integrated with or associated with other elements that are useful in offline data preparation using batch processing or similar techniques to prepare various datasets for use in real-time execution at another time. For clarity, the offline data preparation elements are shown in a separate secure environment 620B, but in some embodiments, the environments 620A, 620B are co-located, cohosted, or otherwise integrated and separate environments are not required.

Referring again to service provider environment 603B, the three data stores 632, 634, 636 can be programmatically linked to a first data store 638 within the secure environment 620B, which is programmatically linked to a second data store 640. Each of the data stores 638, 640 is programmed to receive and store health data from any of the sources of health data that have been previously described. In one embodiment, the first data store 638 of secure environment 620B is implemented using an online, cloud-based file system such as AMAZON S3 to better facilitate exports of data to other systems and the second data store 640 is implemented using a data warehouse such as SNOWFLAKE to facilitate strong data analytics, but other embodiments can use different means of configuring or implementing the data stores. In some embodiments, the data stores 638, 640 can be integrated in a single dataset, data store, or data storage device, or form a federated system.

Master data in a digitally stored format such as a master data file 650 can be periodically loaded to one or more relational database tables of the second data store 640 from an external service that is used to slice and dice data and display aggregated statistics around the potential audience size and provide a breakdown by various dimensions such as age, genre, and clinical codes. In an embodiment, master data file 650 represents a measurable universe of persons or accounts such as patients available with relevant clinical codes; the master data file can be tokenized using de-identified tokens at the time it is loaded to the second data store 640. A master data file 650 is not required in all embodiments and can be omitted by indexing all health data that has otherwise been described or by using a federated system of a plurality of datasets.

2.2 Process Overview

FIG. 7 illustrates an example process or algorithm that can be programmed to implement an embodiment. FIG. 7 shows a sequence of operations that can be programmed to execute in real time as a user computer, like user computer 602, interacts with functional elements of the service provider environment.

At block 702, the process is programmed to receive campaign targeting data and audience definition filter data. For example, with user computer 602, a marketer enters campaign targeting details and an audience definition in terms of one or more filters. An example of a user interface with filters for audience definition is shown in US Pat. Pub. US 2021/0005325, the entire contents of which are hereby incorporated by reference for all purposes as if fully set forth herein. The effect of block 702 is to receive via user input or from user computer 602 one or more filter specifications that define a target audience and a forecast request. The other steps of FIG. 7 can be executed in real time in response to the forecast request.

At block 704, the process is programmed to create and send, to the secure environment, a list of filters to define a cohort. For example, planner service instructions 606 call wrapper service 622 to deliver filter data to the secure environment 620A. A cohort may comprise a set of individual persons in any relevant domain, including patients or user accounts. In an embodiment, cohort data contains a large number of data points and is useful in training the machine learning models that have been described in other sections herein. Cohort data can be delivered for each individual model separately, as further described herein in section 2.3.

At block 706, within the secure environment 620A, a function of an application programming interface associated with the service provider of environment 603A queries a master index dataset to receive a result set comprising aggregated statistics data that matches the planning parameters. The index dataset contains a full universe of all individuals, patients, or accounts of which the secure environment 620A has records in cloud storage system 626 and linked, in one embodiment, to a list of healthcare codes that have been associated with the records or patients for one or more periods. Example periods include the past one, three, and five years. The creation of the master index dataset targeted using the foregoing query is further described herein at block 810 of FIG. 8.

At block 708, a set of aggregated data comprising statistics with various dimensions is received in the service provider environment. For example, wrapper service 622 returns a result set of the records specified above to the planner service instructions 606 in response to a programmatic call.

At block 710, a set of historical data is programmatically transferred to the forecasting engine. For example, in response to block 708, planner service instructions 606 calls the forecasting engine 608 and programmatically transfers media delivery historical data that the planner service instructions had previously received from media data 612 via platform 610. The forecasting engine 608 is programmed to return, in response to the call, an estimated number of media deliveries or impressions that the platform can deliver to a given audience based on the specified targeting parameters. In some embodiments, elements of forecasting also execute in the HIPAA-compliant environment; for example statistics from data store 804 can aggregate in the HIPAA-compliant environment, then the statistics can be programmatically transferred to the forecasting engine 608, joined with one or more elements of media data, such as historical media delivery data, then used to train a model, which outputs forecast data. These steps can be programmed to execute in seconds and in real-time.

At block 712, the aggregated statistics and a media delivery forecast are displayed to the user computer 602, for example, in a graphical user interface. As a result, the user computer 602 receives a view of data not previously available in other systems; having entered campaign targeting details and audience definitions or filters, the user can receive, in a real-time response, statistical data concerning media deliveries or impressions that are likely to be delivered and a forecast of the media deliveries or impressions, without having access to PII associated with patient data records or other personal data records, but for audiences or segments that match the targeting details and audience definitions. Furthermore, in the specific domain of digital advertising targeted to patients, statistics and forecasts are based indirectly on values for patients that are known to be associated with specific health data, and/or specific demographic data, but the user computer 602 and the functional elements of service provider environments 603A, 603B never have access to that sensitive data, which is both tokenized and fully contained within the secure environments 620A, 620B.

FIG. 8 illustrates an example process or algorithm that can be programmed to implement an embodiment. FIG. 8 shows a sequence of operations that can be programmed to execute offline as pre-processing steps to prepare the various data sources for use. In some embodiments, the process of FIG. 3 can be scheduled at any of several different intervals or frequencies, for example once per day to once per three months.

A first portion of the process of FIG. 8 can execute in the service provider environment 603B and generally comprises receiving historical digital media delivery data and/or opportunities data from the platform; receiving demographic data from a demographic data service provider separate from the service provider environment; calling a third-party token service to generate the second de-identified token values for the demographic data to associate the second de-identified token values with demographic segments, and to generate the third de-identified token values for the historical media delivery data that associates third de-identified token values with one or more of media deliveries or impressions, opportunities, and clicks; and programmatically copying the demographic data and historical media delivery data to a first data store in the secure data processing environment. At step 802, in an embodiment, the process of FIG. 8 is programmed to tokenize delivery and opportunities data with third-party digital tokens. The use of third-party tokens is not required in all embodiments and step 802 also could use the internal tokenization solution of the entity that implements or runs FIG. 8. In one embodiment, the delivery and opportunities data is received from the platform 610 and consists of media deliveries or impression data and advertising opportunity data resulting from audience activations that the platform has executed. In other embodiments, the data tokenized at step 802 is received from an external system. An example is a connected TV provider. Tokenization can be accomplished by the data store 632 or a control program calling an external provider of tokenization services. The tokenized data is stored in data store 632 of service provider environment 603B.

At step 804, the service provider environment receives a demographic dataset from a third-party demographic data provider. In an embodiment, the demographic dataset also has been tokenized to prevent the inclusion of personally identifiable information. The demographic data, which can associate de-identified token values with a list of segments in which the corresponding person, patient, or user account is within, can be stored at the data store 636 of service provider environment 603B.

At step 806, the service provider environment copies or programmatically transfers the datasets into the secure environment. For example, the tokenized media delivery and opportunities data of data store 632, the tokenized historical media delivery data of data store 634, and the demographic data of data store 636 is copied from the service provider environment 603B to the first data store 638 of the secure environment 620B, subject to programmatic controls that prevent transfer of any identifiable information or data points, to enforce privacy and security requirements. For example, the service provider environment is programmed to detect and prevent copying or transfers of names, IP addresses, cookie files, MAIDs, and so forth into either of environments 620A, 620B. In various embodiments, step 806 can comprise transfers of datasets comprising one or more of 1) historical media delivery & opportunities data (including impressions, opportunities, clicks & ACR data), 2) list of demographic segments/demographic data, where demographics includes location-based data such as ZIP codes or DMAs, whether tied to demographic data from other sources or user-provided, 3) health data, 4) user data (e.g. hashed emails, MAIDs, IP addresses, Ramp/third-party identifiers) or online consumer identifiers, 5), other audience onboarding data, and/or 6) publisher first party data (web, mobile, CTV, and other media channel data, including user analytics, content use/interaction). The copying operation can be programmed as a scheduled job, cron job, initiated by one or more database triggers programmed in data stores 632, 634, 636, or manually initiated by an administrator.

At step 808, the service provider environment receives, from the secure environment, a master data file that represents a measurable universe of users, user accounts, or patients, depending on the domain of use. For example, master data file 650 is received at the second data store 640 of secure environment 620. Alternatively, the master data file 650 could be created and accessed by the entity that implements or runs FIG. 8, rather than being received. In an embodiment, the master data file 650 comprises every token that is known to a third-party manager or service provider for health data that produces the master data file; in contrast to the cohort data, the master data file is a constrained data set that contains only, for example, a token value, three demographic attributes and a list of one or more clinical ICD or NDC procedure codes, so that data representing a history of the patient's journey data is omitted. In some embodiments, the data represents a snapshot of the past one year or five years, but other periods can be represented in other embodiments.

At step 810, an application associated with the service provider but deployed within and executing within the secure environment 620B merges the master data file, the historical ads delivery and opportunities data, and the demographic attributes using the token values as key values, and loads this data into the reporting database available for the planning process of FIG. 7. Block 810 can be programmed to cause cloud storage system 626 to execute one or more real-time merge or database table join operations to merge datasets consisting of media deliveries or impressions and opportunities, demographics, and health data, to produce a joined table having records comprising fourth de-identified token values, opportunities statistics, demographic data, and process codes. Block 810 can be programmed to deliver a result set from the joined table to media data 624 and then to wrapper service 622 for response to the planner service instructions 606. Based on the unique token values, the resulting joined table can comprise records that associate a token value, the opportunities statistics values previously described, demographics, and clinical codes.

Upon the conclusion of FIG. 8, a merged dataset is available in cloud storage system 626 for use in the real-time execution process that has been previously described for FIG. 7.

2.3 Integration with Modes of Activation

The datasets resulting from embodiments can be used in multiple different forms of activation. For example, the techniques of sections 2.1 and 2.2 can be integrated with the techniques of section 1 to provide a distributed computer system and privacy-conscious analytical process for market research and targeting or digital advertising that combines demographic data about a population with health data derived from medical claims data to create machine learning models and/or demographic indexes that can predict or show how likely a particular user is to have specific medical conditions. An audience modeling application can be programmed to receive demographic data for a population from a third-party data provider, to receive HIPAA compliant tokens from a second third-party data provider that link the demographic data with health data derived from medical claims data, and to receive the health data from a third third-party data provider who has access to records coded with ICD-10, CPT and NDC codes and can provide representations of those records linked to the tokens. Consequently, users can explore patient data in a privacy-safe, HIPAA compliant environment.

Embodiments also can be used for generating online audience estimates without initiating an activation, forecasting, and benchmarking. For example, embodiments can be used to access data from other data providers and the data of the service provider, and match that data to de-identified health data to verify how many profiles the service provider is capable of reaching online and/or that correspond to verified, confirmed individuals of a particular type, such as patients in healthcare systems. The matching techniques provided herein have utility in confirming counts of individuals having particular attributes rather than in initiating activations, determining the count of verified clinically relevant individuals that exist within a dataset being evaluated, or determining the count of relevant individuals to which media could potentially be delivered.

To achieve HIPAA compliance by not using medical data directly for marketing, embodiments do not require direct access to the health data, but instead work on indirect representations of the data by calculating statistics of typical demographic attributes that people with certain medical conditions have. An example might be "males, 45 years old, overweight have a high chance of having heart disease". This process is called "model training". To train a machine learning model of a patient audience, the demographic data is linked to the medical data via tokens and statistics are calculated for relationships between medical conditions as represented in clinical codes and demographic attributes, producing a useful training dataset. In embodiments, all health data is stored securely exclusively in the secure environments 620A, 620B and not in the service provider environment. Formation of training datasets and model training can be programmed as applications wrapped by wrapper service 622.

A trained machine learning model can be validated automatically using validation logic to check that a model is not too accurate and minimizes the chance that a specific person can be identified from the training data or model output. Validation logic can be programmed as an application wrapped by the wrapper service 622 or otherwise implemented in the secure environment 620A, 620B. Therefore, only trained machine learning models that pass validation are exported from the safe HIPAA compliant environment to a service provider environment. Further details for training, validation, and selective export have been described in section 1.

Once a model has been trained and validated, the model can be activated by evaluating a plurality of user records against the model. A patient audience modeling application can be programmed in the service provider environment 603A for this purpose. If a particular user is scored as likely to have a specific health condition, then the modeling application can be programmed to assign the user to an audience segment that is related to that condition; for example, a user could be assigned to a "heart disease" segment.

When such segments have been defined, advertising agencies can target their ad campaigns to a condition-specific segment via the platform 610. Users of agencies can interact with the service provider environment 603A via the real-time process that has been described herein for FIG. 6, FIG. 7. If at least one campaign is targeted to the condition-specific segment, then for every ad request, bidder logic associated with platform 610 is programmed to inspect the segment assigned to a user who visits a web page with an advertisement, and if the user has been labeled as someone likely to have the condition specified by the segment then the campaign will be delivered.

Figure 9:
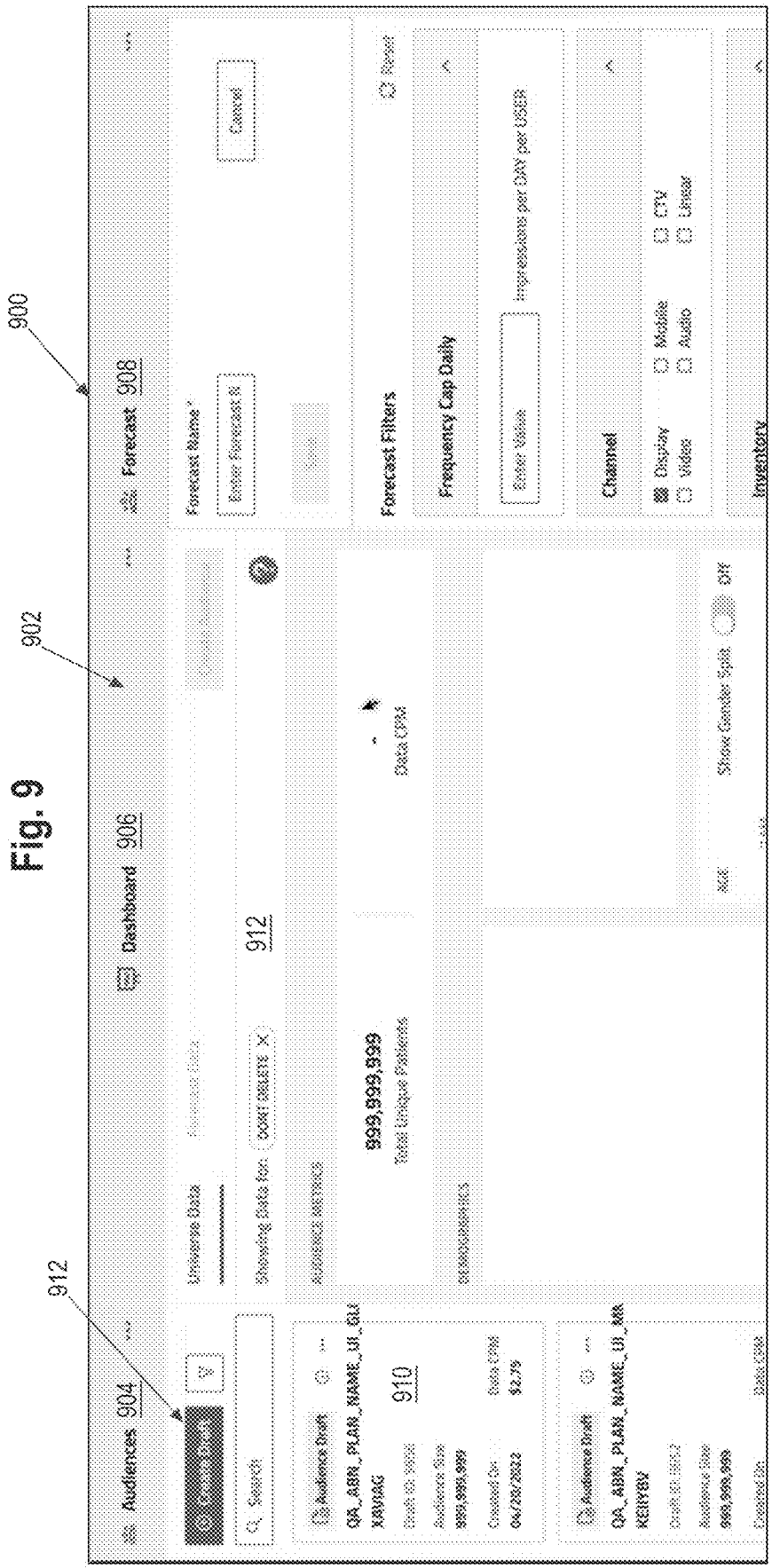
FIG. 9 illustrates a computer display device that has rendered a graphical user interface of a planner.

FIG. 9 illustrates a computer display device that has rendered a graphical user interface of a planner. FIG. 9 illustrates merely one implementation for purposes of showing a clear example, but other embodiments can present similar information, or different data based on the same sources or concepts, and/or using a different order or arrangement of graphical elements. Various embodiments can include more or fewer panels, widgets, and values. In an embodiment, user computer 602 can render the display based on instructions programmed in user interface 604 that interoperate with planner service instructions 606 and the data flows and data sets that the planner service facilitates. In the example of FIG. 9, a computer display device 900 has rendered a GUI 902 that functions with three active, selectable tabs labeled Audiences 904, Dashboard 906, Forecast 908. In the example, Audiences tab 904 is selected and in response the user interface 604 causes the user computer 602 to render a plurality of audience draft panels 910 based on audience universe data shown in panel 912. Each of the audience draft panels 910 represents a digitally stored collection of data values that define an audience of patients or other individuals. Dashboard tab 906 can be selected to access data displays relating to campaigns once an audience has been saved, and is further described herein in other sections below. Forecast tab 908 can be selected to access forecasting functions by entering forecast filter values and then receiving a prediction of the number of media deliveries or impressions that will be delivered in a campaign directed to a specified audience. Further details concerning forecasting are described in other sections herein.

Figure 10A:
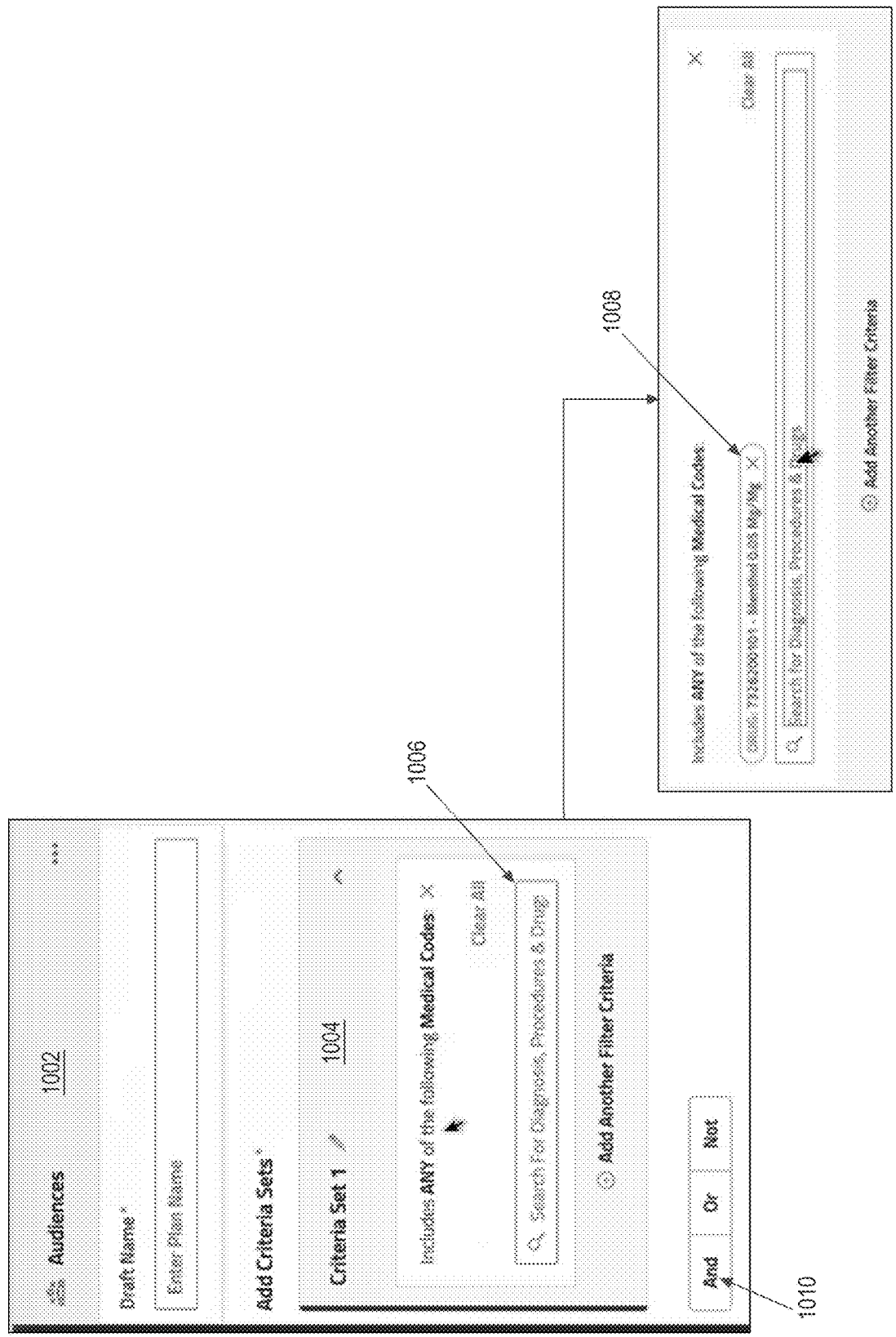
FIG. 10A illustrates an example graphical user interface for an audience criteria panel.

In an embodiment, input from user computer 902 to select a Create Draft link 912 in GUI 902 causes generating presentation instructions for rendering an audience criteria panel. FIG. 10A illustrates an example graphical user interface for an audience criteria panel. FIG. 10A illustrates merely one implementation for purposes of showing a clear example, but other embodiments can present similar information, or different data based on the same sources or concepts, and/or using a different order or arrangement of graphical elements. Various embodiments can include more or fewer panels, widgets, and values. In an embodiment, panel 1002 comprises a criteria set panel 1004 to define rules or criteria for attributes of an audience. A search box 1006 is programmed to accept input to search for a diagnosis, procedure, or drug, via text or a numeric value such as an ICD code, drug code, or group of codes. Input in search box 1006 can correspond to values that are represented in the master data file 650; entering a value causes a dynamic query to a table of available values and updating the panel 1004 to show a matching code 1008 as a filter criteria. Any number of filter criteria can be specified in this manner.

Figure 10B:
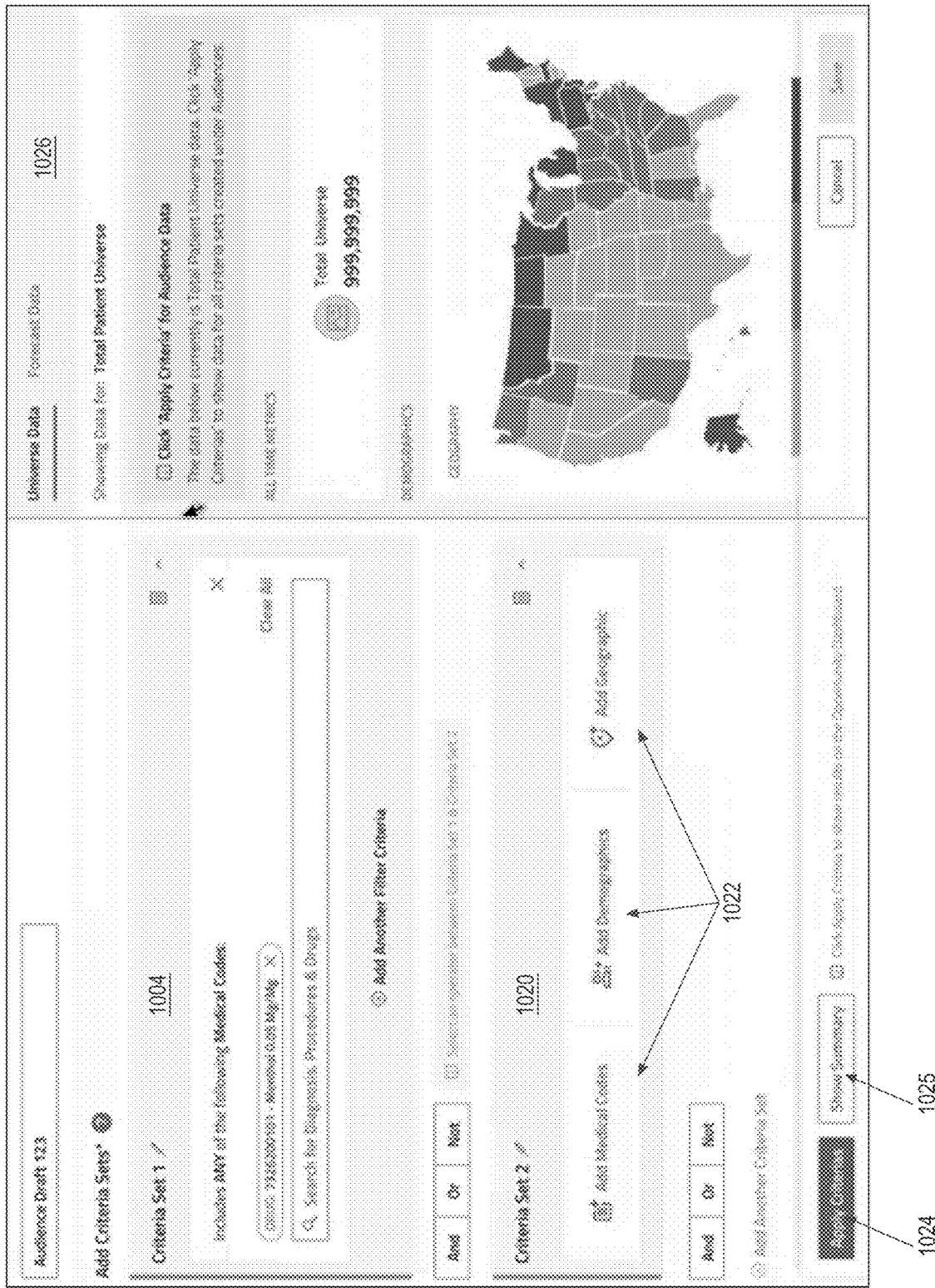
FIG. 10B illustrates an example in which a first criteria set is defined, and a second criteria set is undergoing definition.

Any number of criteria sets can be defined and joined by Boolean operators 1010 such as AND, OR, NOT. FIG. 10B illustrates an example in which a first criteria set is defined, and a second criteria set is undergoing definition. FIG. 10B illustrates merely one implementation for purposes of showing a clear example, but other embodiments can present similar information, or different data based on the same sources or concepts, and/or using a different order or arrangement of graphical elements. Various embodiments can include more or fewer panels, widgets, and values. The second criteria set 1020 or any other criteria set can define any of medical codes, demographic values, or geographic values to encompass persons or patients with specified demographic attributes such as age or gender, or located in a particular state or other geographic unit. Links 1022 can be selected to specify whether to add a code, demographic, or geographic.

Figure 10C:
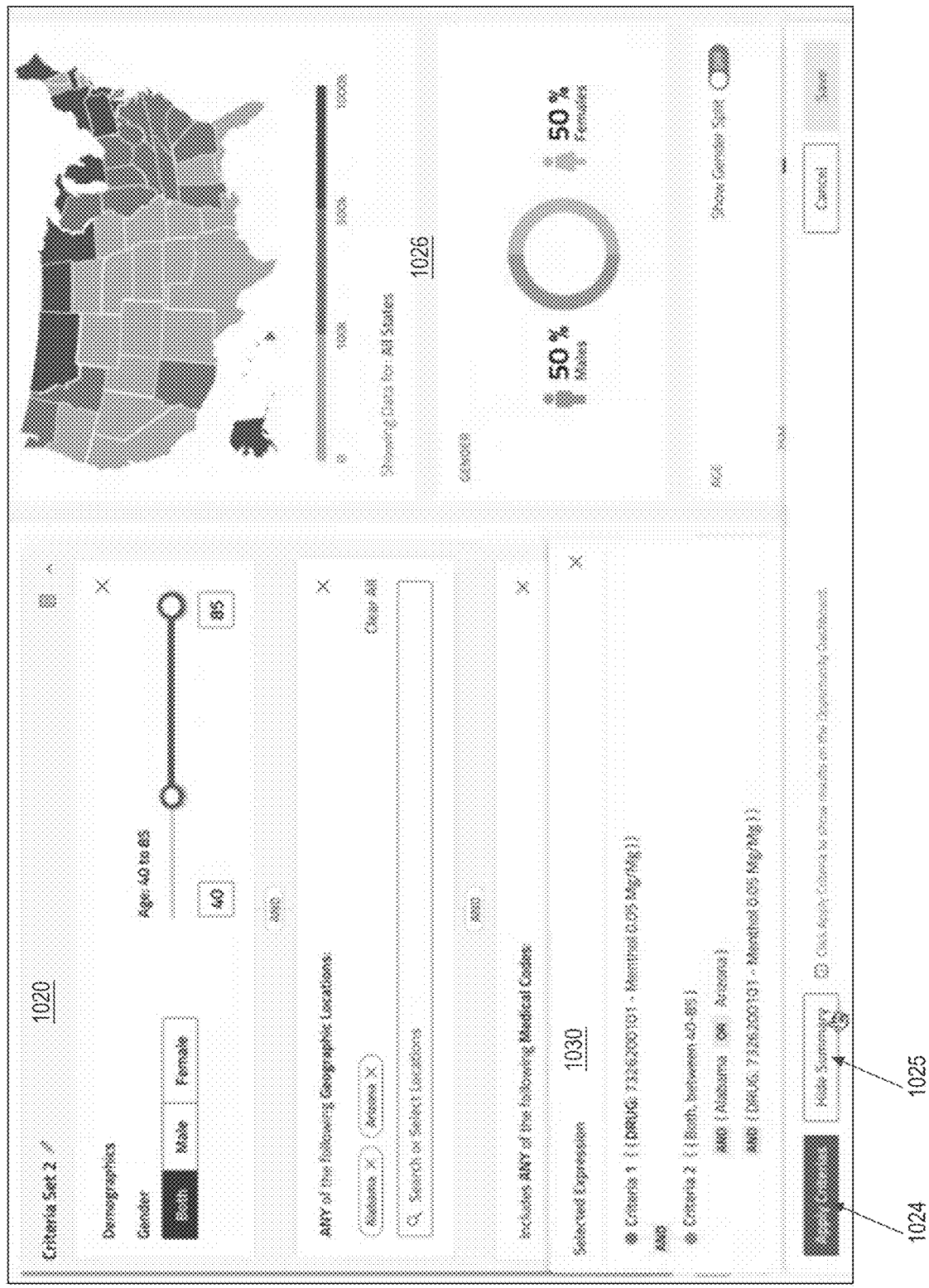
FIG. 10C illustrates an example of a portion of a screen display in which a second criteria set has been added.

Assume that user input from user computer 602 specifies, for the second criteria set 1020, demographic values of BOTH for Gender and "40" to "85" for Age, and geographic values of ALABAMA and ARIZONA. FIG. 10C illustrates an example of a portion of a screen display in which a second criteria set has been added. Further, in FIG. 10C user input has selected a Show Summary link 1025 of FIG. 10B. In response, the display of FIG. 10C is dynamically updated to include an expression panel 1030 that provides a concise summary, in a format similar to a database query or SQL, of the criteria that the user entered. Link 1025 then toggles to show a Hide Summary link. This feature allows the user to concisely review a complex set of filter criteria before they are applied. FIG. 10C is intended to present one example of criteria that could be used; but other embodiments can use different criteria; for example, ACR criteria or device-specific criteria for CTV or mobile could be used, as well as criteria based upon browsing history.

In response to input selecting the Apply Criteria link 1024, in an embodiment, the planner service instructions 606 are programmed to generate and submit a filter based on the specified criteria sets to the wrapper service 622 with a request to return statistical data corresponding to the filter. In response to receiving statistical data back from the secure environment 620A, the dashboard display can be programmed to automatically update a universe data panel 1026 to visually indicate the number of persons or patients within an audience that matches the filter.

Figure 11A:
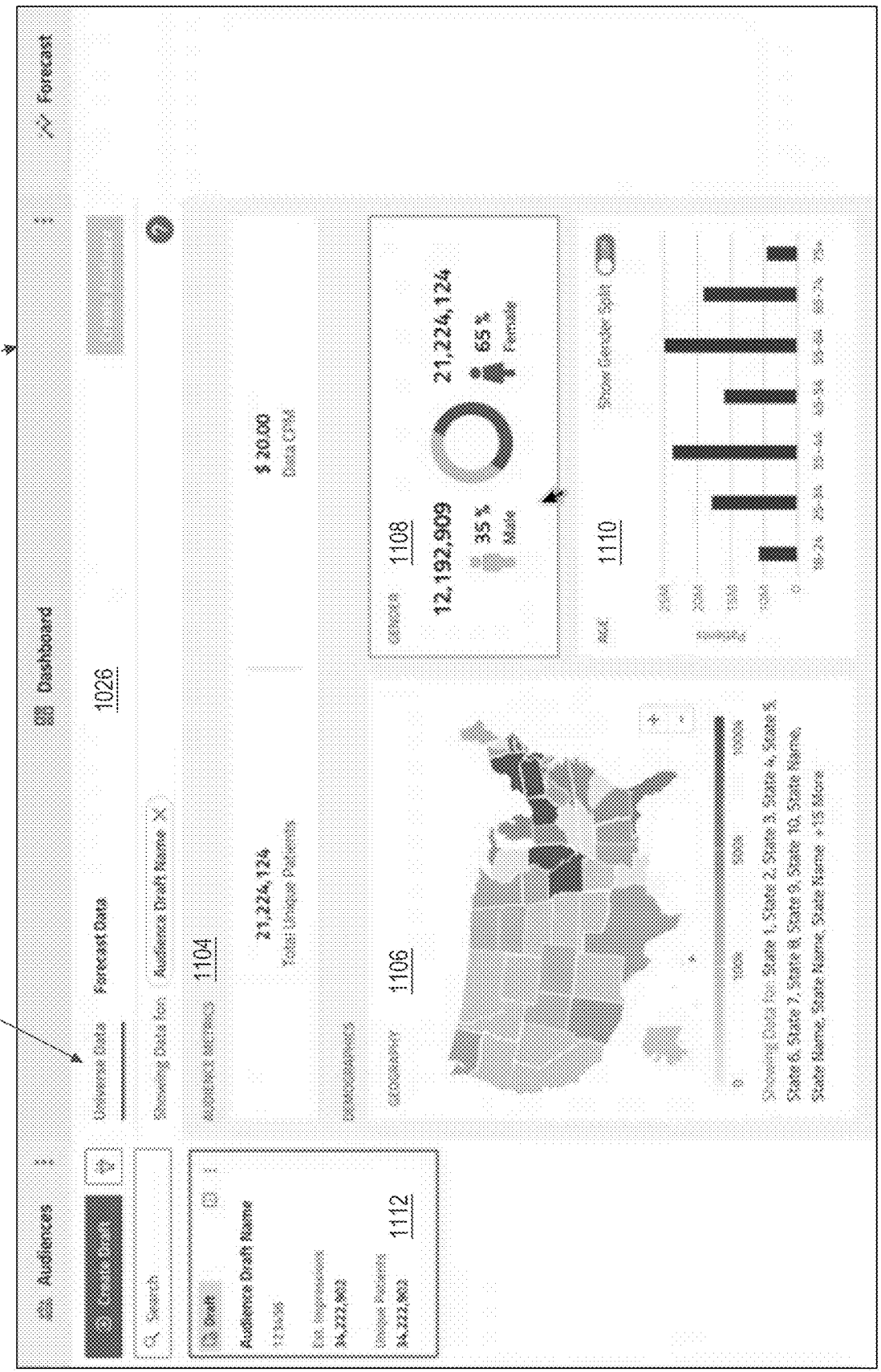
FIG. 11A illustrates an example in which the Dashboard link and a Universe Data link have been selected.

FIG. 11A illustrates an example in which the Dashboard link 1026 and a Universe Data link 1102 have been selected. FIG. 11A illustrates merely one implementation for purposes of showing a clear example, but other embodiments can present similar information, or different data based on the same sources or concepts, and/or using a different order or arrangement of graphical elements. Various embodiments can include more or fewer panels, widgets, and values. In response, planner service instructions 606 have caused rendering a GUI 1100 comprising an updated universe data panel 1026 having a plurality of panels 1104, 1106, 1108, 1110 with data values for persons matching the specified criteria sets. Each panel is dynamically updated when criteria change and are applied. Panels 1104, 1106, 1108, 1110 can comprise any of integer values, dollar values, visual maps, bar graphs, ring charts, or other visualizations of actual data obtained as a result of database queries, to the merged data, using the criteria sets.

In an embodiment, selecting the Dashboard link 1026 and a Universe Data link 1102 after saving the criteria sets as part of a named audience draft causes collapsing the criteria set interface into an audience panel 1112 that provides estimates of total media deliveries or impressions and unique persons or patients within the specified audience. Any number of audiences can be defined and saved in this manner and displayed as collapsed panels for reference purposes and rapid access.

The audience panel 1112 represents one example of a data panel that FIG. 11A can include; in another embodiment, a claims patients total is shown in panel 1112. Further, FIG. 11A illustrates an audience draft version to explore claims data before forming a patient modeled audience; in other embodiments, different audience types can be used, including audiences from third-party providers. Embodiments can be programmed to show patient overlaps between a plurality of different audiences. Thus, while FIG. 11A shows one example of metrics and aggregates that could be displayed, other embodiments can use modified versions, for example, including CTV-specific metrics, a browsing history breakdown, or other information.

Figure 11B:
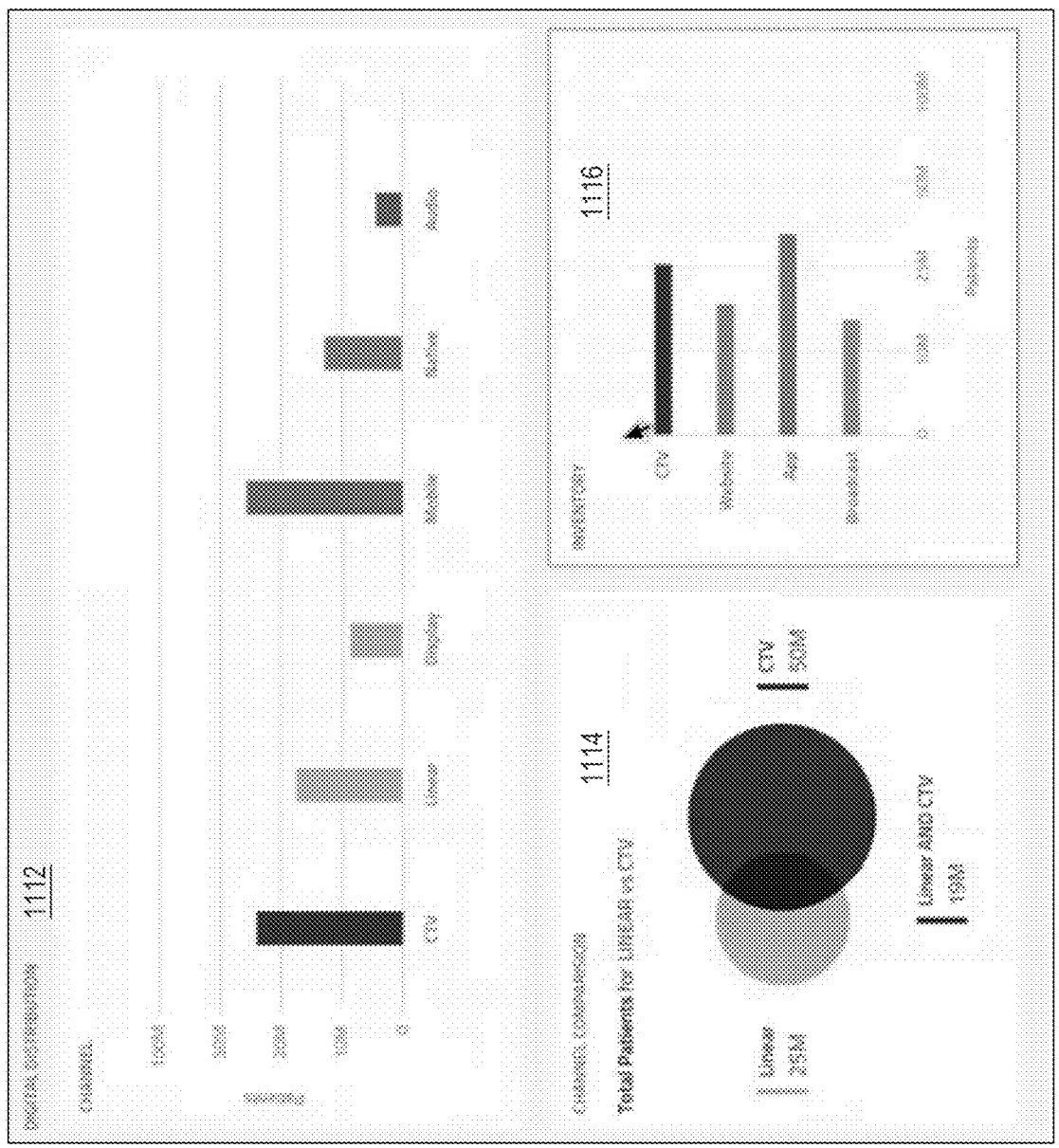
FIG. 11B is an example of additional data panels that can be generated dynamically and displayed as part of the display of FIG. 11A after scrolling.

In an embodiment, panel 1026 is scrollable and includes panels and elements other than shown in FIG. 11A. FIG. 11B is an example of additional data panels that can be generated dynamically and displayed as part of the display of FIG. 11A after scrolling. In an embodiment, panel 1112 shows persons or patients that are estimated to be reached via a plurality of different digital media channels such as connected TV, linear, display, mobile, and others. Panel 114 can be programmed to show a channel comparison using a graphical Venn diagram or the equivalent with circles or other elements representing volumes of persons or patients in different channels, so the user can understand the incremental number of persons or patients reached in one channel or another. Panel 1116 can be programmed to show inventory data. As with FIG. 11A, FIG. 11B shows one example of metrics and aggregates that could be displayed, other embodiments can use modified versions.

FIG. 12A, FIG. 12B illustrate examples of graphical user interfaces that can be programmed to receive input specifying forecast data filter criteria. FIG. 12A, FIG. 12B comprise a plurality of panels labeled according to filter criteria category such as channel, inventory, demographics, geographics, frequency cap daily, device type, creative type, viewability. Each panel can be programmed with a plurality of GUI widgets such as checkboxes to receive input specifying one or more filter criteria of a category. When all desired values have been selected, input to a Save link or the equivalent can be programmed to cause saving data representing all GUI widget values to a named forecast plan. FIG. 12A, FIG. 12B each illustrate merely one implementation for purposes of showing a clear example, but other embodiments can present similar information, or different data based on the same sources or concepts, and/or using a different order or arrangement of graphical elements. Various embodiments can include more or fewer panels, widgets, and other data filters; examples include ad campaign budget and timeline preferences.

Figure 13A:
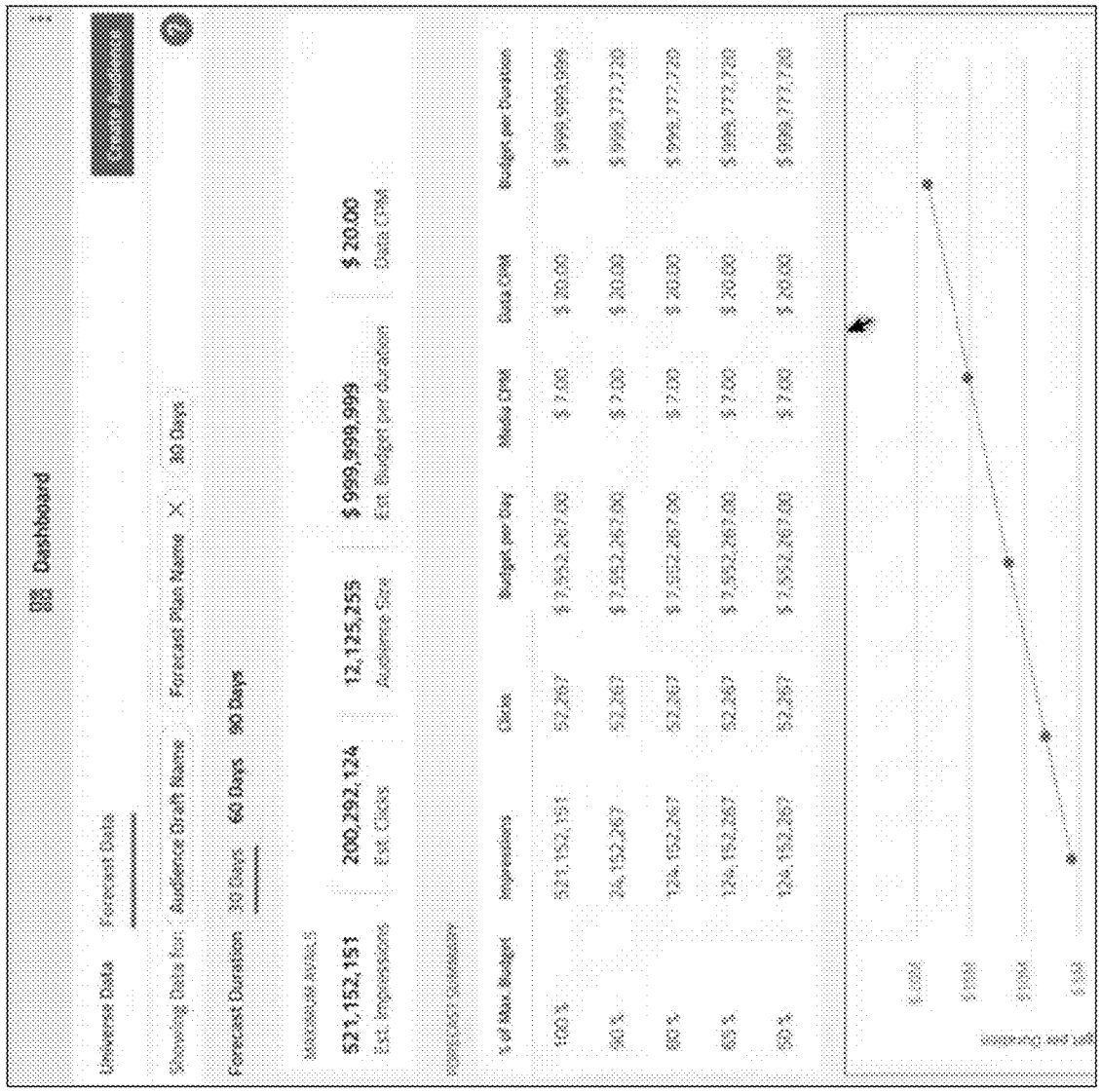
FIG. 13A illustrates an example forecast data display for a defined audience and forecast plan.
Figure 13B:
FIG. 13B illustrates an example forecast data display with data values organized by channel.

The interface can include a link labeled Apply Criteria or similar. Selecting such a link is programmed to cause dynamic generation of forecast data output which can be visualized by selecting a Forecast Data link in panel 1026 of FIG. 11A. In response, the planner service instructions 606 are programmed to generate a forecast data display. FIG. 13A illustrates an example forecast data display for a defined audience and forecast plan; FIG. 13B illustrates an example forecast data display with data values organized by channel. Each of FIG. 13A, FIG. 13B illustrates merely one implementation for purposes of showing a clear example, but other embodiments can present similar information, or different data based on the same sources or concepts, and/or using a different order or arrangement of graphical elements.

The example of FIG. 13A shows a forecast for a campaign of 30 days, but links can be provided to select and dynamically update FIG. 13A for campaigns of other periods. The forecast data display can include maximum available values for metrics such as estimated media deliveries or impressions, clicks, audience size, budget, and CPM. A forecast summary table can provide breakouts of the maximum values based on the use of different percentages of a campaign budget. FIG. 13B also has been programmed to output data by channels.

The datasets produced with the disclosed techniques can operate in activation approaches other than audience modeling. Examples of activation include building an audience with or without modeling; one-to-one targeting, while observing controls consistent with HIPAA and/or other legal regimes relating to individual privacy; informing targeting; setting targeting parameters; clinical research and analytics, including combining with CRM/business-relationship data; performing clean room analytics; evaluating strategy, such as determining the best combination of data sources to use for targeting/audience building, forecasting the count of verified clinically relevant individuals that exist within a dataset being evaluated, or forecasting the count of relevant individuals to which media could potentially be electronically delivered.

3. Benefits of Certain Embodiments

The systems and methods described herein contribute to the technical character of machine learning system use by being particularly adapted to a specific technical implementation where instructions to generate a training dataset and machine learning system and to train said machine learning system using the training dataset are received from an external server computer. Meanwhile, the server computer within the protected environment is used to train and validate the machine learning system which is then released from the protected environment to be used by the external computing system. This unique technical implementation of machine learning systems provides additional data protections for information stored by the server computer by performing the training and validations in the server computer in a manner where the initial training data cannot be viewed by a user of an external device.

The systems and methods described herein further provide a practical application of a machine learning system through the generation and training of the machine learning system in a protected environment in a server computer. These systems and methods provide a particular means of solving a technical problem, the use of protected information without providing said protected information into an environment where it can be seen or used by a user. By using stored rules to validate the machine learning system in the protected environment and providing a means for defining the generation and training of the machine learning system from outside the environment and without access to the training data, the systems and methods described herein provide a technical solution to a technical problem of how to provide a trained machine learning system which protects training data without providing access to said training data.

A planner service as disclosed herein, alone or in combination with an audience modeling application and forecasting, provides new ways of planning the presentation of digital media such as advertising based on matching campaign goals, framed in terms of healthcare procedures, prescriptions, or other attributes reflected in actual medical claims data for real patients, without marketers ever having access to private, sensitive, or legally protected data. Raw data files for healthcare claims or clinical encounters, or derived from such data sources, are maintained exclusively in a secure data processing environment that is logically separate from and inaccessible directly by a service provider environment that is involved in campaign definition, audience definition, campaign forecasting, and activation. Novel data merge techniques enable joining records of past digital media deliveries or impressions, or opportunities, and demographic data from third-party sources to health data based on de-identified tokens that uniquely represent but are not traceable to individual persons or patients, then deriving statistics from the joined results as a foundation for accurate forecasts of campaign performance including expected media deliveries or impressions.

As a result, a user computer coupled to the service provider environment receives a view of data not previously available in other systems. Having entered campaign targeting details and audience definitions or filters, the user can receive, in a real-time response, statistical data concerning media deliveries or impressions that are likely to be delivered and a forecast of the media deliveries or impressions, without having access to PII associated with patient data records or other personal data records, but for audiences or segments that match the targeting details and audience definitions. Furthermore, in the specific domain of digital advertising targeted to patients, statistics and forecasts are based indirectly on values for patients that are known to be associated with specific clinical codes for specific clinical procedures or conditions in the past, and/or specific demographics, but the user computer and the functional elements of the service provider environment never have access to that sensitive data, which is both tokenized and fully contained within the secure environments.

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
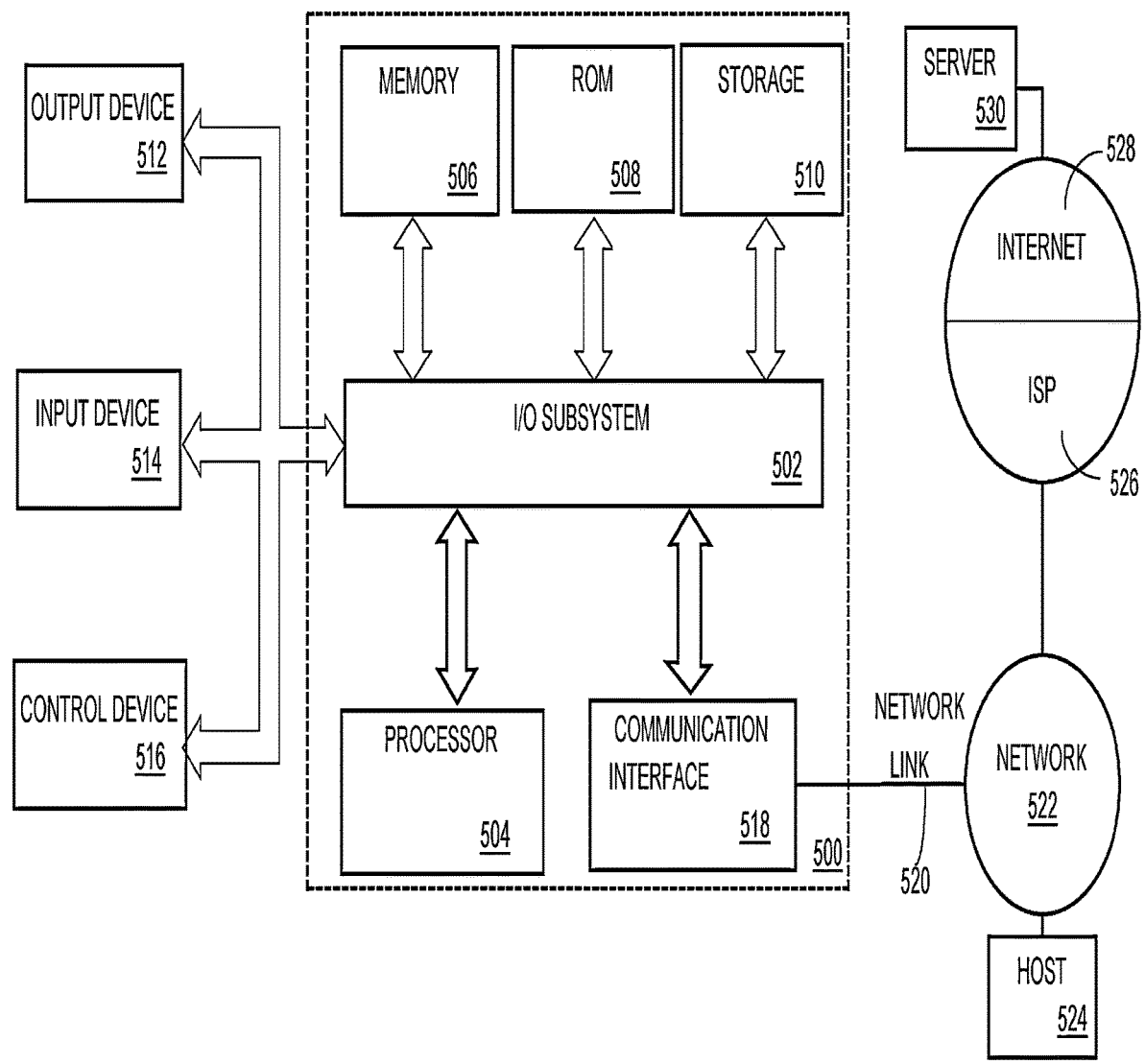
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502.

Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by individuals (either within or external to the organization, according to the cloud's public/private nature). Depending on the particular implementation, the precise definition of components or features provided by or within each cloud service layer can vary, but common examples include: Software as a Service (SaaS), in which individuals use software applications that are running upon a cloud infrastructure, while a SaaS provider manages or controls the underlying cloud infrastructure and applications. Platform as a Service (PaaS), in which individuals can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which individuals can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which individuals use a database server or Database Management System that is running upon a cloud infrastructure, while a DbaaS provider manages or controls the underlying cloud infrastructure, applications, and servers, including one or more database servers.

In the foregoing specification, embodiments of have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer implemented method comprising:
receiving and storing in relational database tables in a secure data processing environment comprising one or more first virtual machine instances coupled to one or more first data stores, master data comprising records having first de-identified token values associated with health data and second data comprising records having second de-identified token values associated with historical media delivery data;
in the secure data processing environment, executing one or more database table join operations to merge the master data and the second data to produce a joined table having records comprising third de-identified token values associated with the health data and the second data;
receiving, using one or more virtual computing instances of a service provider environment, one or more filter specifications that define a target audience and a forecast request, and in real time in response to the forecast request:
based on the one or more filter specifications, executing one or more queries to the joined table in the secure data processing environment;
receiving, in the service provider environment, de-identified aggregated data that the secure data processing environment has generated based upon the one or more queries to the joined table;
based on the de-identified aggregated data and second data, generating an estimate of media delivery reach;
presenting the estimate of the media delivery reach to a user computer that is communicatively coupled to the service provider environment.

2. The method of claim 1, further comprising generating the estimate of media delivery reach as an estimate of one of: media delivery reach to the target audience; an estimate of a number of interactions the target audience may take with delivered media; an estimate of a number of behaviors the target audience may perform after viewing deliver media.

3. The method of claim 1, the second data comprising any one or more of: advertising data; media data; individual data; demographic data; historical digital advertising data comprising any of media deliveries or impressions, opportunities, or clicks; television ACR data.

4. The method of claim 1, further comprising:
receiving and storing in relational database tables in a secure data processing environment comprising one or more first virtual machine instances coupled to one or more first data stores;
the master data comprising first records having first de-identified token values associated with health data;
the second data comprising second records having second de-identified token values associated with demographic data;
third data comprising third records having third de-identified token values associated with historical media delivery data comprising one or more of television ACR data, impressions, opportunities, and clicks;
executing the one or more database table join operations to merge the master data, the second data, and the third data to produce the joined table having records comprising fourth de-identified token values associated with the health data, the demographic data, and the historical media delivery data.

5. The method of claim 1, further comprising receiving the master data from one or more data sources separate from the secure data processing environment.

6. The method of claim 1, the joined table comprising records having first de-identified token values associated with demographic data and health data for one or more of: clinical medical data, prescription data specifying drug prescriptions, and/or medical claims data.

7. The method of claim 1, the master data comprising a single dataset or one or more decentralized data sets that combine to create a federated dataset.

8. The method of claim 3, the demographic data comprising one or more of demographic segments, gender, and age and geographic location data of an individual, the geographic location data including but not limited to an address, latitude-longitude (lat-long) data, GPS coordinates, DMA (designated marketing area), ZIP code, city, county, or another geographical unit.

9. The method of claim 1, further comprising transmitting the filter specifications that define a target audience to one or more targets for activation that serve media to cause presentation of a targeted media delivery on a computer associated with members of the target audience.

10. The method of claim 9, the filter specifications being transmitted with instructions for use by one or more of an advertising exchange, media server and/or media and advertisement display channel.

11. The method of claim 1, further comprising receiving the historical digital media delivery data and/or opportunities data from the advertising, data, and media platform or system; receiving the demographic data from a demographic data service provider separate from the service provider environment; calling a third-party token service to generate the second de-identified token values for the demographic data to associate the second de-identified token values with demographic segments, and to generate the third de-identified token values for the historical media delivery data that associates third de-identified token values with one or more of media deliveries or impressions, opportunities, and clicks; programmatically copying the demographic data and historical media delivery data to a first data store in the secure data processing environment.

12. The method of claim 1, further comprising receiving the historical digital media delivery data and/or opportunities data from the platform; receiving the demographic data from a demographic data service provider separate from the service provider environment; generating the second de-identified token values for the demographic data to associate the second de-identified token values with demographic segments, and generating the third de-identified token values for the historical media delivery data that associates third de-identified token values with one or more of media deliveries or impressions, opportunities, and clicks; programmatically copying the demographic data and historical media delivery data to a first data store in the secure data processing environment.

13. The method of claim 1, further comprising generating and displaying a graphical user interface that is programmed to receive input from the user computer specifying filter attributes for one or more of: for health data by diagnosis, prescription drug use or procedure, for healthcare system interactions such as in-office healthcare provider visitations or telehealth visitations, for health insurance coverage, for health insurance providers, for genetic information, for survey responses, for geography, for demographic attributes, for ad opportunities, for media deliveries or impressions, for ACR, for diagnosis codes, for prescription drug codes, and for procedure codes, by publisher, by media owner, by media and advertising platform, by data provider.

14. The method of claim 5, the advertising, data, and media platform or system being programmed for generating instructions for ranking media deliveries or impressions based upon one or more of target procedure codes, target diagnosis codes, counts of unique patients, or estimated numbers of media deliveries or impressions; generating instructions for submitting bids for purchasing media deliveries or impressions based upon the ranking of the media deliveries or impressions.

15. The method of claim 1, the master data comprising records having first deidentified token values associated with health data.

16. The method of claim 1, the master data comprising records having first deidentified token values associated with any of: medical clinical codes comprising any of International Statistical Classification of Diseases and Related Health Problems (ICD) codes, Current Procedural Terminology (CPT) codes, Healthcare Common Procedure Coding System (HCPCS) codes, J codes, or National Drug Code (NDC) codes for prescriptions, or LOINC codes for laboratory tests.

17. The method of claim 1, further comprising:
receiving a query that specifies one or more filter criteria;
based on the one or more filter criteria, and based on the de-identified aggregated statistics data and historical media delivery data from an advertising, media, or data platform or system, generating an updated estimate of the number of media deliveries or impressions that the advertising, media, or data platform or system can deliver to the target audience or an updated estimate of a number of interactions the target audience may take with delivered media or an updated estimate of a number of behaviors the target audience may perform after viewing deliver media;
presenting the updated estimate and the de-identified aggregated statistics data to the user computer.

18. The method of claim 1, further comprising the ability to forecast the delivery of digital content such as digital advertisements, optionally including data specifying a distribution or counts of potential media deliveries or impressions, clicks, or other interactions, or delivery of digital advertisements to one or more specified media channels, applications, or websites, by publisher, by media owner, by media or advertising platform, or by data provider.

19. The method of claim 1, further comprising:
based on the de-identified aggregated statistics data and historical media delivery data from an advertising, media, or data platform or system, generating:
two or more estimates of numbers of media deliveries or impressions that the advertising, media, or data platform or system can deliver to two or more different target audiences that match the health data, or
two or more estimates of numbers of interactions that two or more target audiences that match the health data may take with delivered media, or
two or more estimates of numbers of behaviors that two or more target audiences that match the health data may perform after viewing deliver media;
presenting the two or more estimates and the de-identified aggregated statistics data to the user computer concurrently.

20. One or more non-transitory computer readable storage media instructions which when executed using one or more computers cause the one or more computers to perform:
receiving and storing in relational database tables in a secure data processing environment comprising one or more first virtual machine instances coupled to one or more first data stores, master data comprising records having first de-identified token values associated with health data and second data comprising records having second de-identified token values associated with historical media delivery data;
in the secure data processing environment, executing one or more database table join operations to merge the master data and the second data to produce a joined table having records comprising third de-identified token values associated with the health data and the second data;
receiving, using one or more virtual computing instances of a service provider environment, one or more filter specifications that define a target audience and a forecast request, and in real time in response to the forecast request:
based on the one or more filter specifications, executing one or more queries to the joined table in the secure data processing environment;
receiving, in the service provider environment, de-identified aggregated data that the secure data processing environment has generated based upon the one or more queries to the joined table;
based on the de-identified aggregated data and second data, generating an estimate of media delivery reach;
presenting the estimate of the media delivery reach to a user computer that is communicatively coupled to the service provider environment.

21. The non-transitory computer readable storage media of claim 20, further sequences of instructions which when executed cause performing: generating the estimate of media delivery reach as an estimate of one of: media delivery reach to the target audience; an estimate of a number of interactions the target audience may take with delivered media; an estimate of a number of behaviors the target audience may perform after viewing deliver media.

22. The non-transitory computer readable storage media of claim 20, the second data comprising any one or more of: advertising data; media data; individual data; demographic data; historical digital advertising data comprising any of media deliveries or impressions, opportunities, or clicks; television ACR data.

23. The non-transitory computer readable storage media of claim 20, further comprising:
receiving and storing in relational database tables in a secure data processing environment comprising one or more first virtual machine instances coupled to one or more first data stores;
the master data comprising first records having first de-identified token values associated with health data;

the second data comprising second records having second de-identified token values associated with demographic data;

third data comprising third records having third de-identified token values associated with historical media delivery data comprising one or more of television ACR data, impressions, opportunities, and clicks;

executing the one or more database table join operations to merge the master data, the second data, and the third data to produce the joined table having records comprising fourth de-identified token values associated with the health data, the demographic data, and the historical media delivery data.

24. The non-transitory computer readable storage media of claim 20, the joined table comprising records having first de-identified token values associated with demographic data and health data for one or more of: clinical medical data, prescription data specifying drug prescriptions, and/or medical claims data.

25. The non-transitory computer readable storage media of claim 20, further comprising:

based on the de-identified aggregated statistics data and historical media delivery data from an advertising, media, or data platform or system, generating:

two or more estimates of numbers of media deliveries or impressions that the advertising, media, or data platform or system can deliver to two or more different target audiences that match the health data, or two or more estimates of numbers of interactions that two or more target audiences that match the health data may take with delivered media, or two or more estimates of numbers of behaviors that two or more target audiences that match the health data may perform after viewing deliver media;

presenting the two or more estimates and the de-identified aggregated statistics data to the user computer concurrently.

26. A distributed computer system comprising:

a secure data processing environment comprising one or more first virtual machine instances coupled to one or more first data stores; a service provider data processing environment comprising one or more second virtual computing instances coupled to one or more non-transitory computer readable storage media instructions which when executed using one or more computers cause the one or more computers to perform:

receiving and storing in relational database tables in a secure data processing environment comprising one or more first virtual machine instances coupled to one or more first data stores, master data comprising records having first de-identified token values associated with health data and second data comprising records having second de-identified token values associated with historical media delivery data;

in the secure data processing environment, executing one or more database table join operations to merge the master data and the second data to produce a joined table having records comprising third de-identified token values associated with the health data and the second data;

receiving, using one or more virtual computing instances of a service provider environment, one or more filter specifications that define a target audience and a forecast request, and in real time in response to the forecast request:

based on the one or more filter specifications, executing one or more queries to the joined table in the secure data processing environment;

receiving, in the service provider environment, de-identified aggregated data that the secure data processing environment has generated based upon the one or more queries to the joined table;

based on the de-identified aggregated data and second data, generating an estimate of media delivery reach;

presenting the estimate of the media delivery reach to a user computer that is communicatively coupled to the service provider environment.

27. The computer system of claim 26, further comprising sequences of instructions which when executed cause performing: generating the estimate of media delivery reach as an estimate of one of: media delivery reach to the target audience; an estimate of a number of interactions the target audience may take with delivered media; an estimate of a number of behaviors the target audience may perform after viewing deliver media.

28. The computer system of claim 26, the second data comprising any one or more of: advertising data; media data; individual data; demographic data; historical digital advertising data comprising any of media deliveries or impressions, opportunities, or clicks; television ACR data.

29. The computer system of claim 26, further comprising sequences of instructions which when executed cause performing:

receiving and storing in relational database tables in a secure data processing environment comprising one or more first virtual machine instances coupled to one or more first data stores;

the master data comprising first records having first de-identified token values associated with health data;

the second data comprising second records having second de-identified token values associated with demographic data;

third data comprising third records having third de-identified token values associated with historical media delivery data comprising one or more of television ACR data, impressions, opportunities, and clicks;

executing the one or more database table join operations to merge the master data, the second data, and the third data to produce the joined table having records comprising fourth de-identified token values associated with the health data, the demographic data, and the historical media delivery data.

30. The computer system of claim 26, the joined table comprising records having first de-identified token values associated with demographic data and health data for one or more of: clinical medical data, prescription data specifying drug prescriptions, and/or medical claims data.

* * * * *